(12) United States Patent
Andersson et al.

(10) Patent No.: US 6,341,126 B1
(45) Date of Patent: Jan. 22, 2002

(54) INHOMOGENEOUS CONNECTIONS

(75) Inventors: Staffan Andersson, Enskede; Lars John Ola Dagberg, Stockholm, both of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/177,552

(22) Filed: Oct. 23, 1998

Related U.S. Application Data

(63) Continuation of application No. PCT/SE97/00626, filed on Apr. 14, 1997.

(30) Foreign Application Priority Data

Apr. 26, 1996 (SE) ................................................ 9601605

(51) Int. Cl.[7] ................................................ H04L 12/28
(52) U.S. Cl. ........................ 370/351; 370/355; 370/386
(58) Field of Search ................................. 370/351, 355, 370/386, 397, 399, 400, 401, 409

(56) References Cited

U.S. PATENT DOCUMENTS 5,402,471 A 3/1995 Van Nielen
5,434,852 A 7/1995 La Porta et al.
5,809,233 A * 9/1998 Shur ........................... 709/230

FOREIGN PATENT DOCUMENTS

WO 94/06251 3/1994
WO 96/08931 3/1996

* cited by examiner

Primary Examiner—Wellington Chin
Assistant Examiner—Brenda H. Pham
(74) Attorney, Agent, or Firm—Burns, Doane, Swecker & Mathis, L.L.P.

(57) ABSTRACT

In a call and connection separated network that includes a number of domains, the network has a layered structure that includes a connection layer and a service layer. In each connection domain there is a connection control process for controlling hardware. An external network is used to carry a transmission channel that originates from or terminates in the call and connection separated network. Such calls are referred to as inhomogeneous calls. A connection control process at the originating side of an inhomogeneous call uses a routing number to route the transmission channel through the external network. The routing number is administered by a service used by the control process at the terminating point of the call. The routing number follows the signalling protocol of the external network.

31 Claims, 16 Drawing Sheets

INHOMOGENEOUS CONNECTIONS

This application is a continuation of International Application No. PCT/SE97/00626 filed on Apr. 14, 1997, which designates the United States.

TECHNICAL FIELD

This invention relates to a call and connection separated telecom network, wherein software related to service handling is separated from software related to connection handling. In particular service handling takes place at a call layer while connection handling takes place at a connection layer. In the following a call and connection separated telecom network is referred to as a CCS network.

BACKGROUND

A connection which goes from the CCS network to an external network and from there back to the CCS network and which uses a service that is administered completely within the CCS network is called an inhomogeneous connection. In an inhomogeneous connection all service handling takes place within the CCS network, while connection handling takes place in the CCS network as well as in the external network.

A call the service and connection handling of which takes place solely within the CCS network is said to be carried by a homogeneous connection.

Service handling includes service control, service execution, service signalling, service installation, service modification and service administration.

Connection handling related to the set up and release of connections and to the control of the physical telecom network which comprises switches, trunks extending between switches and other hardware devices, such as tone senders, conference equipment, connected to the switches.

The connection layer is an abstraction that comprises a model of the physical network, its switches and its trunk lines. Subscriber data, routing tables and information of general character relating to a group of switches, to the trunk lines extending between said group of switches and to the subscribers and subscriber lines served by said group of switches are stored in a common data base. Said group of switches, trunk lines, subscribers and subscriber lines are in the following referred to as a domain. Accordingly a domain has its own database integrity.

Today's telecommunication networks are characterized by specialization. The telex network transports telex information, POTS (plain old telephony service) is transported by the public switch telephone network (PSTN) package switched data networks (PSDN) based on X.25 protocols transport computer data and coaxial tree network of the community antenna TV network (CATV) transports television signals. Each of these networks is designed for its individual service and can generally not transport another service. For instance PSTN does not transport TV-signals and voice is difficult to transport over an X.25 network because of large end-to-end delay. Only in exceptional cases service transported by one network can be transported by another. For example PSTN, originally designed to transport voice, is capable of transporting computer data at a limited speed provided modems are used at both ends of the network.

It is expensive to build new physical telecom networks for every new service.

U.S. Pat. No. 5,434,852 relates to a communications network for delivery of broadband and narrowband communications services. The communications network has a layered architecture comprising: (a) call servers providing user-to-user and user-to-network functions, (b) service-specific servers providing the services to be used in a call, and (c) connection servers providing for connection establishment and release. Homogeneous connections extending between several networks, all designed in the same manner, are described in the patent.

In U.S. Pat. No. 5,402,471 a method of transferring a connection between PSTN and a mobile telephony network is shown, wherein call control and connection control are separated in predefined intelligence points (mobile switch centers in the mobile telephony network, or exchanges in PSTN). Inhomogeneous connections between the two networks are contemplated. Inhomogeneous connections using an intermediate network are not described therein. For example a call between two mobile stations using the PSTN as an intermediate network is not contemplated, since such a call is routed within the mobile network only. Nor is a call between two subscribers within the PSTN, said call using the mobile network as an intermediate network, contemplated, since such a call is routed within the PSTN only.

SUMMARY

A main object of the present invention is to provide for re-use of the physical structure of today's existing telecommunication networks to transport other services than those for which they were originally designed.

Another object of the invention is to provide a call and connection separated telecom network that allows for establishment of inhomogeneous connections.

Still another object of the invention is to provide a CCS network that uses an external network to set up a connection between two nodes within the CCS network.

A further object of the invention is to provide for re-use of a call originating network access process and of a call terminating network access process for the set up of a homogeneous as well as of an inhomogeneous connection.

Another object of the present invention is to provide a call and connection separated telecommunication network in which a service related signalling is independent of signalling used for set up of connection in such a manner that today's existing non-separated telecommunication networks are used solely for set-up and control of connections while service related signalling takes place over the signalling network.

The advantages with the invention is that existing networks are used as a medium for setting up connections while the services, existing services as well as future services, are handled by a signalling network generally independent of the physical network used for connection establishment.

The use of a CCS network makes it possible to use the call layer for a particular service and to use the connection layer to set up a connection with the required characteristics, such as STM, ATM, between any two users.

An inhomogeneous connection allows for the use of an existing network to set up a connection, while the service is transported at the call level of the call.

The hardware as well as software of the signalling network constitutes a signalling layer that is generally independent of the hardware as well as software of the connection layer. When new services are created, or existing services are upgraded or modified, this is done solely at signalling layer and is generally independent of the software and hardware used for connection establishment. Some minor modifications only need to be made at the connection layer in order to adapt the connection layer to the new service.

The inventive method is not obligable to existing networks only but be used in connection with new networks as well.

The above objections are achieved by a CCS network as defined by the accompanying claims.

DETAILED DESCRIPTION

Figure 1:
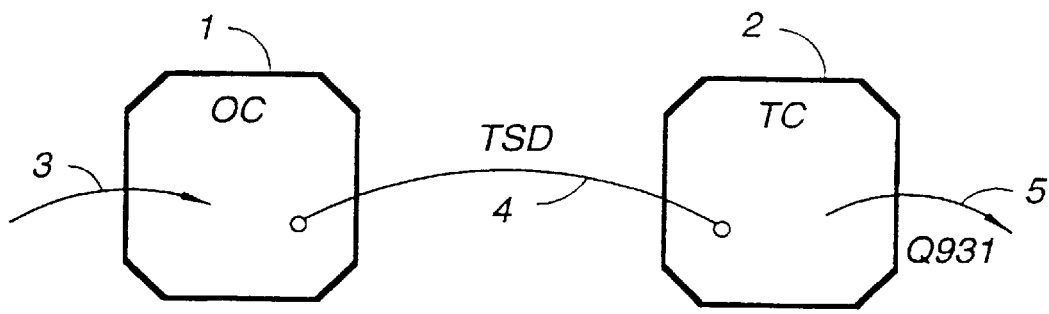
FIGS. 1–3 are block diagrams illustrating the interaction between processes taking place at the originating and terminating sides respectively of a call handled by a particular application.
Figure 2:
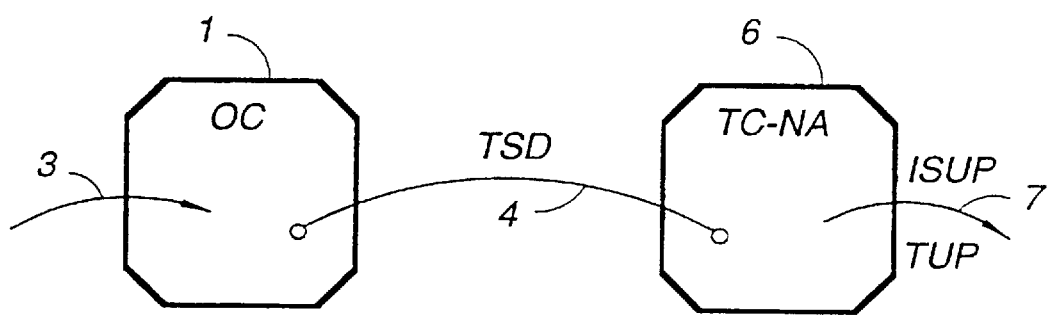
Figure 3:
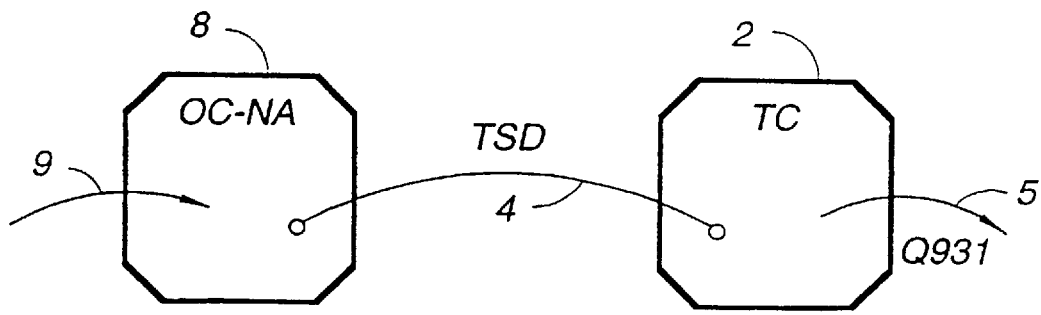

FIGS. 1–3 will be used to illustrate the known half-call principle, in accordance with which the two end points of one and the same call are associated with a respective process, each one controlling the operations required to be executed at the respective end of the call. The two processes do also communicate with each other in order to establish i.a. the kind of service to execute. In the following examples the POTS service will be described although it should be understood that any other telecom service may be contemplated, such as ISDN (Integrated Services Digital Network), VLL (Virtual Leased Lines), GSM (Global System for Mobile telephony), video on demand and may others.

Two examples of POTS services are an ordinary call between two subscribers and a conference service between several subscribers. In the following an ordinary call between two subscribers A and B will be described.

In FIG. 1 two service processes 1, 2 of an application is shown. In particular process 1 is software which is created and executed at an originating part of a call and will therefore be referred to as the originating call process, abbreviated OC process. Process 2 is software that is crated and executed at the terminating part of the same call and is referred to as the terminating call process, abbreviated TC process. The OC process 1 executes in the local switch to which the subscriber A is connected, and the TC process 2 executes in the local switch to which subscriber B is connected.

Both processes 1 and 2 are subscriber access processes. This means that when a subscriber wants to make a call she/he lifts the receiver of the telephone. This is signalled to the local office over an access signalling protocol 3. In response to the detection that the subscriber has lift the receiver the OC process 1 is started in the local office. Exactly what happens within the OC process 1 is no part of the invention and will therefore not be described in detail. Generally seen the subscriber will receive a tone prompting her/him to dial the b-number. The OC process 1 will receive the dialled digits, will analyze the digits and send them for direction analysis in order to find out the destination, in a signalling network to be described, of the call and what kind of service is requested. When the destination of the call and the type of requested service have been identified, the destination and the service are signalled by OC process 1 to TC process 2 over a signalling protocol 4.

Signalling protocol 4 is a teleservice dialogue protocol, abbreviated TSD, of the kind described in our WO-A-9406251. A main feature of the TSD protocol is its ability to establish a direct signalling path between an originating node of a call and a terminating node of the same call. It allows for the addition of a new service in the originating and terminating nodes without the need to implement the new service in the intermediate nodes via which the same call is routed at the connection layer. The TSD protocol is also used for localizing software in a distributed processor system.

The signalling over the TSD protocol takes place on an end-to-end basis.

Upon receipt of the signalling from the OC process 1 the TC process 2 will be started. The exact processes being performed in TC process 2 will not be described in detail since they depend on the particular application used. Generally seen the TC process 2 checks the state of subscriber B in order to find out if B is busy or not. The TC process 2 can do this in different ways depending on the system design. As a first example TC process 2 can signal over a signalling protocol 5, different from the TSD protocol 4, to subscriber B. As a second example TC process 2 can check the status of subscriber B in a data base. The signalling protocol 5 is typically the Q931 standard signalling protocol. The TC process 2 also checks that subscriber B is allowed to receive call i.e. subscriber B is not banned by the network operator.

In FIG. 2 the OC process 1 communicates with a terminating call process 6 other over the TSD protocol 4. The OC process 1 is the same as that one shown in FIG. 1. The terminating call process 6 is a terminating call network access process, abbreviated TC-NA process, which communicates to a network access point, now shown, over a protocol 7. Protocol 7 is either the ISUP (integrated services user part) protocol or the TUP (telephony user part) protocol. The TC-NA process 6 will in this case not signal to a subscriber but to a local switch in an external network.

Assuming that subscriber A is the same in FIGS. 1 and 2, then the OC process 1 may activate either TC process 2 or the TC-NA process 6 depending on the service requested by subscriber A.

The type of TC process, 2 or 6, is selected depending on location of subscriber B. If the subscriber B is resident in an external service network, then the network access terminating call process TC-NA is used. If the subscriber B is resident within the own service network, then the terminating call process TC is used.

In FIG. 3 an originating call process 8 is shown to be a network access originating call process, abbreviated OC-NA process, which signals, with a protocol 9, an incoming call to the CCS network in accordance with the invention. This situation would appear if the originating part of the call is situated in an external network and the terminating part of the same call is situated in the CCS network in accordance with the present invention. The terminating call process is the TC process 2 which signals to the called subscriber over the signalling protocol 5. Processes 8 and 2 are communicating with each other over the TSD protocol 4.

An OC-NA process 8 can signal to a TC-NA process 6 over the TSD protocol 4. This situation occurs for transit calls. A transit call originates from a first external network, terminates in a second external network and uses a CCS network in accordance with the invention as an intermediate network.

Each process in the described process pairs 1, 2 and 1, 6 and 8, 2 and 8, 6 are referred to as half call processes. A call is thus divided into two parts each part having its respective software. The two call halves of a call communicate over a signalling network and agree upon the service to be delivered to the requested connection.

Figure 4:
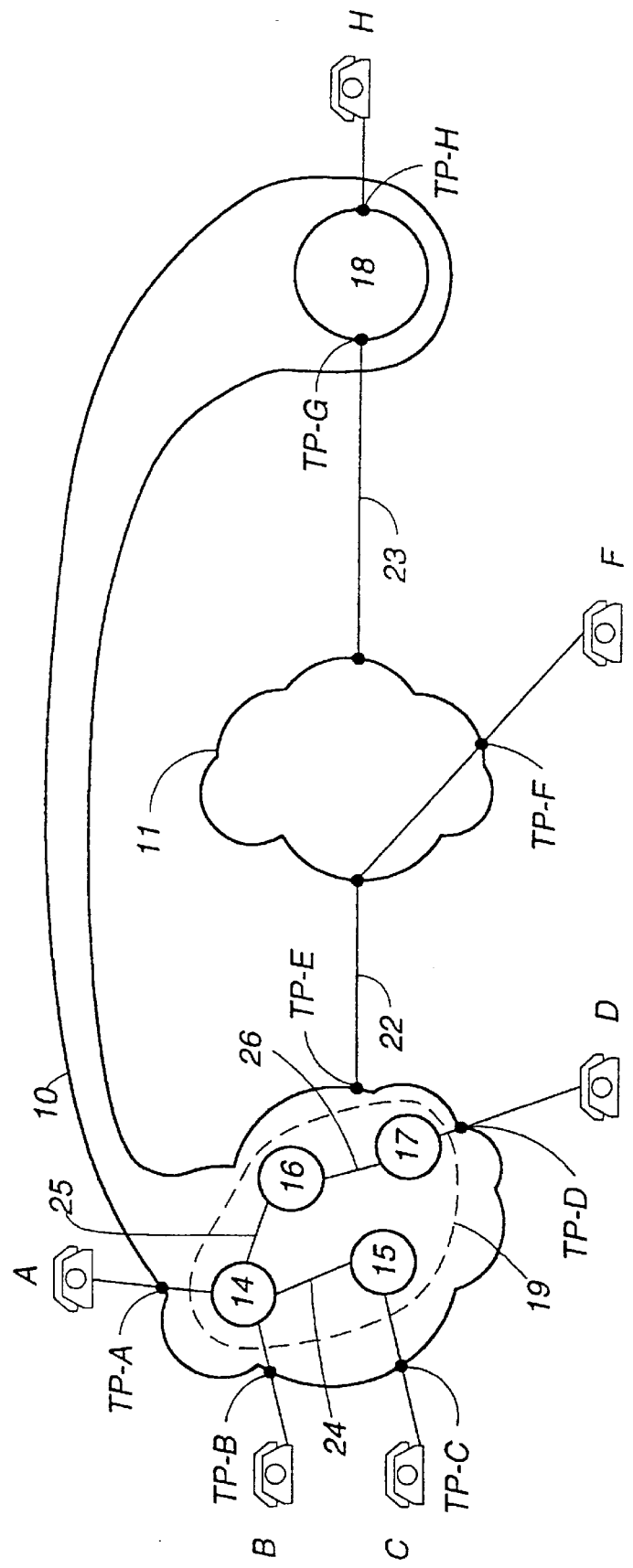
FIG. 4 illustrates a telecommunication network wherein the present application is used.

FIG. 4 is a schematic diagram showing a CCS network 10 and an external network 11. The CCS network 10 has a call layer 12 and a connection layer 13 as shown in FIGS. 6–11, 13–15. The call layer is sometimes referred to as the service layer and caters for services. The connection layer caters for establishment and release of connections.

The cloud in FIG. 4 symbolizes the extent of the CCS network 10. Within the network 10 there are domains 14, 15, 16, 17 and 18. Domains 14, 15, 16 and 17 together form a homogenous network 19. Domain 18 is referred to as a satellite domain that cannot be connected homogeneously with the homogeneous network 19.

Figure 5:
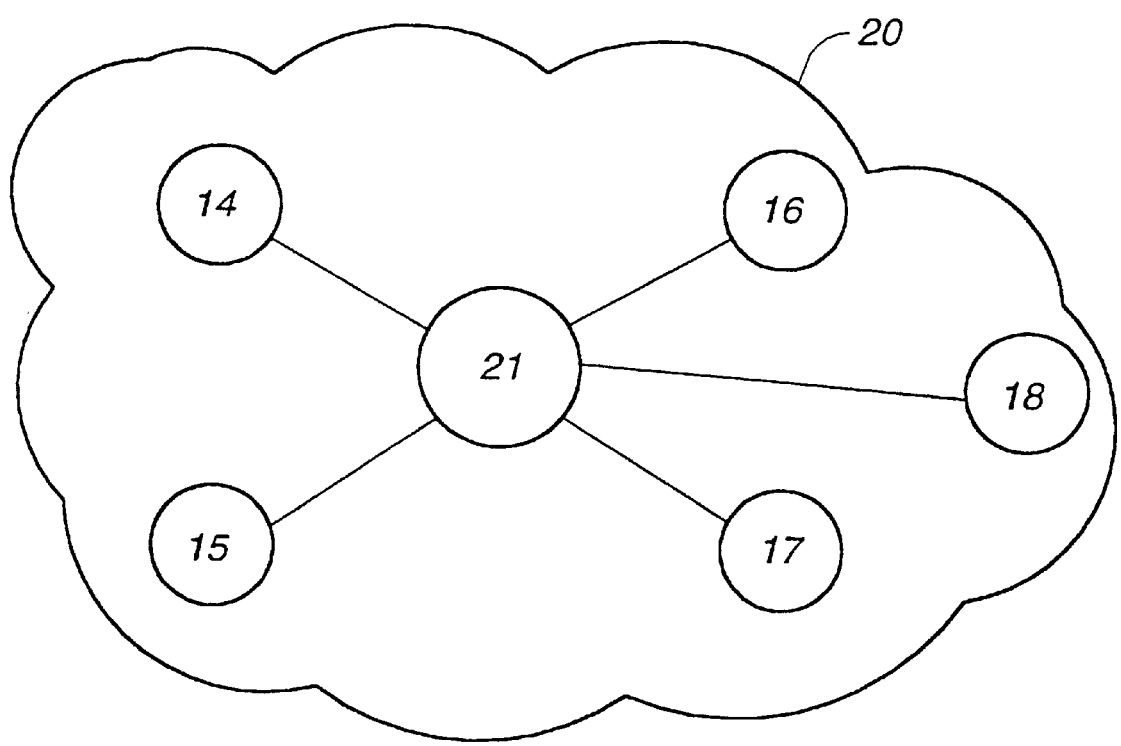
FIG. 5 is a signalling network used in the telecommunication network of FIG. 4.

In FIG. 5 a signalling network 20 is shown. In particular the signalling network 20 comprises nodes 14–18 corresponding to the domains 14–18, and a central signalling node 21 in a star network configuration. A domain in the CCS network 10 can signal to any other domain by using the signalling network 20.

Satellite domain 18 is geographically so remote from the cluster of domains 14–17 that a direct trunk from the homogeneous network 19 to domain 18 is not motivated in view of the costs it would take to provide and install a trunk. Instead domain 18 is connected the homogeneous network 19 via the external network 11. External network 11 uses a signalling protocol different from the TSD protocol 4. There is a trunk 22 providing communication between the homogeneous network 19 and the external network 11 and there is another trunk 23 providing communication between the external network 11 and the satellite domain 18.

The CCS network 10 uses the half call principle described in connection with FIGS. 1–3. Legends A, B, C, and D are subscribers connected to the homogeneous network 19, F is a subscriber connected to the external network 11 and H is a subscriber connected to the satellite domain 18. In the homogeneous network 19 in the CCS network 10 the domains 14, 15, 16 and 17 are interconnected with trunk lines 24, 25 and 26 in the indicated manner. Each domain 14–18 comprises one, two or more switches.

The signalling network 20 in FIG. 5 caters for service signalling and connection control signalling between domains. The signalling network is either separated from the physical network that makes up the CCS network 10 or is a part of said physical network in which case the signalling network comprises for example leased lines extending between the domains 14–18 in such a manner a switch in a domain has a direct connection with any other switch in the same domain and with any other switch in any other domain.

Figure 6:
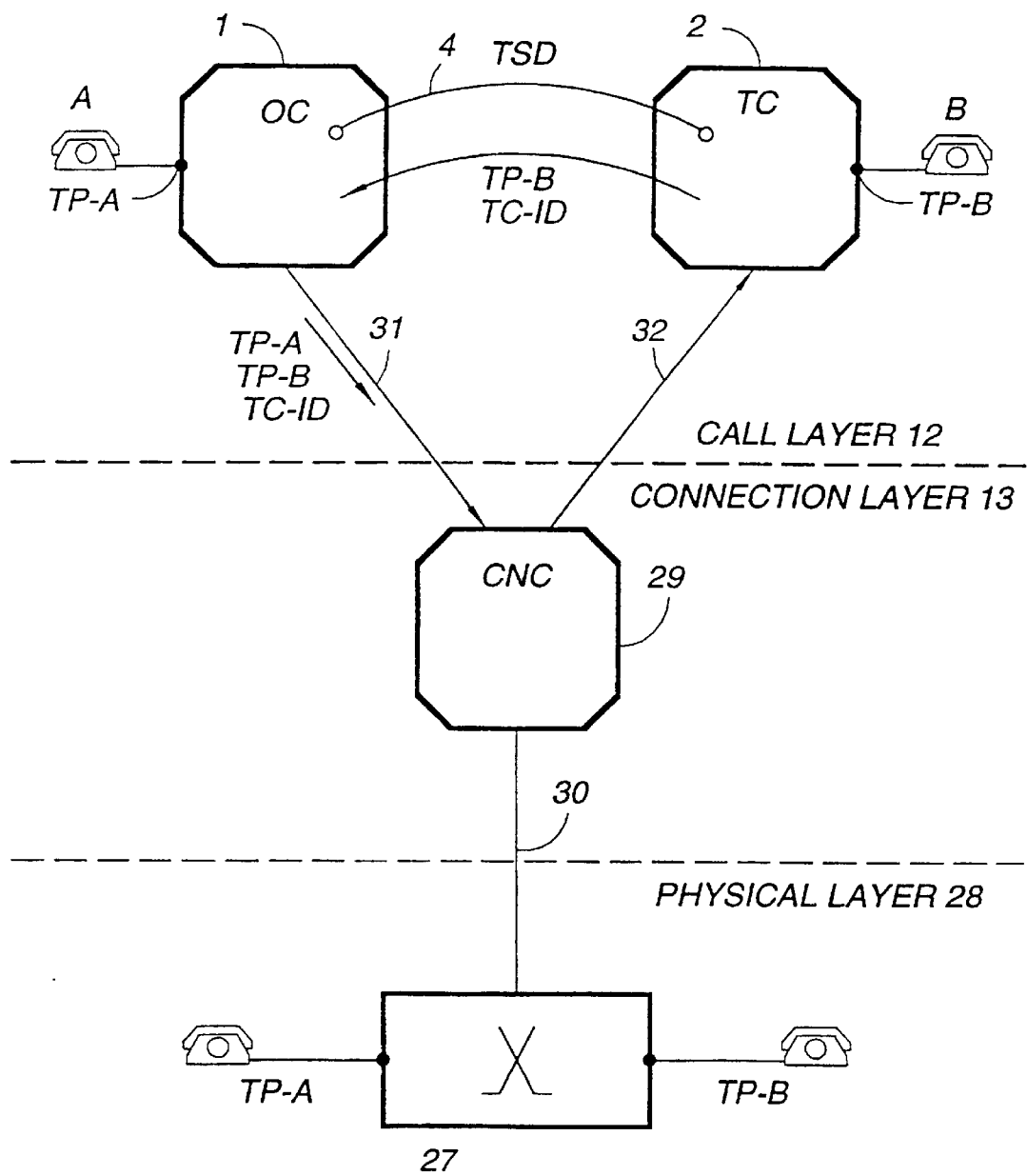
FIG. 6 is block diagram illustrating a call between two user served by the same switch.

In FIG. 6 it is contemplated that subscribers A and B are served by one and the same switch 27 resident in domain 14. In FIG. 6 the layered structure of the CCS network 10 is shown to comprise the call layer 12, the connection layer 13 and a physical layer 28. The physical layer comprises the switch 27, the access devices of subscribers A and B, in this case telephones, as well as the subscriber lines connecting the subscribers to the switch. The switch serves many subscribers but for the sake of clearness only A and B are shown. At the connection layer 13 a connection control process 29, abbreviated CNC process, executes. The CNC process comprises functions for setting up connections through the switch 27, through switches within domain 14 or for initiation the set up of a connection that extends over several of the domains within the homogeneous network 19, as well for set up of a connection to the satellite domain 18.

Subscriber A has an access point TP-A to the switch 27. Similarly subscriber's B access point to the switch 27 is denoted TP-B. In the following the access points of two subscribers between which a connection should be set up are referred to as termination points TP. It should be noted that a termination point constitutes an end point of a connection. A connection may comprise just two termination points, which is a normal case, or may comprise several terminations points which is the case in a point-to-multipoint or a multipoint-to-point connection.

The CNC process 29 controls switch 27, as symbolized by line 30, and communicates with the OC- and TC processes 1 and 2 via a signal protocol symbolized by arrows 31 and 32 respectively. The communications over 31 and 32 take place within the domain 14.

When subscriber A lifts the receiver from her/his telephone, the OC process 1 is created. The OC process performs direction analysis of the B-number dialed by A using a non shown direction analysis table in order to get information on the domain in which subscriber B i located. In this case B is situated in the same domain 14 as A.

As input data for the direction analysis the B-number is used and as result of the direction analysis the domain in which the call is to be terminated is given.

Next the OC process 1 starts the TC process 2. The TC process 2 checks if subscriber B is free. For the sake of the example B is assumed to be free and TC process 2 will now mark subscriber B as busy. Next TC process 2 signals to OC process 1 the termination point TP-B of subscriber B as well as its own process identity TC-ID. The TC process 2 also signals to OC process 1 that the called subscriber B is free. The OC process 1 now knows that a connection can be set-up. The OC process 1 will now create the CNC process 29 and will send a call set-up request to the CNC process 29 and will include in said request the terminations points TP-A, TP-B and TC-ID. Upon receipt of TP-A, TP-B and TC-ID the CNC process performs routing analysis to find out the way to termination point TP-B at the physical layer.

As input data for the routing analysis domain and termination points are given. Routing analysis uses routing tables as will be described below. As output data from routing analysis a trunk line identity or an EOS (end of selection) indication is given.

In this case the CNC process 29 receives an EOS indication which means that TP-B is within domain 14. The CNC process 29 will next set up a connection between TP-A and TP-B and send a READY signal to the TC process 2 over the protocol shown by arrow 32. The READY signal indicates that the requested connection has been set up.

Next a ring signal is sent to subscriber B and a ring tone is sent to subscriber A. The process that is responsible for this and the way this is carried out depends on the system design.

For the sake of the example it is assumed that subscriber B answers the call. A and B can now communicate. The CNC process 29 supervises the connection and when subscriber A puts back the receiver in the telephone cradle the CNC process 29 is requested to release the connection between TP-A and TP-B. The CNC process 29 also marks subscribers A and B as free and will report this back to the OC process 1. Next the OC process 1 kills processes 2 and 29 and, when this has been done, finally kills itself.

The described example may be varied in many ways and depends on the way the POTS service system is designed. The design may vary from country to country. For example the connection between TP-A and TP-B can be established at the same time as subscriber B is marked as reserved. As still an alternative the connection is not established until subscriber B answers the call by lifting her/his receiver. Also, the order in which the processes are killed may be different.

There is one CNC process created for each domain 14–18 and connection. Accordingly, if a connection extends over a domain which comprises several switches these will all be controlled by one and the same connection control process. If a connection extends over several domains, a CNC process is created in each domain. If there are several different connections in a domain each one will be associated with a respective CNC which controls its respective connection. A CNC belongs to the connection layer 13 and signals to another CNC over the signalling network 20.

Figure 7:
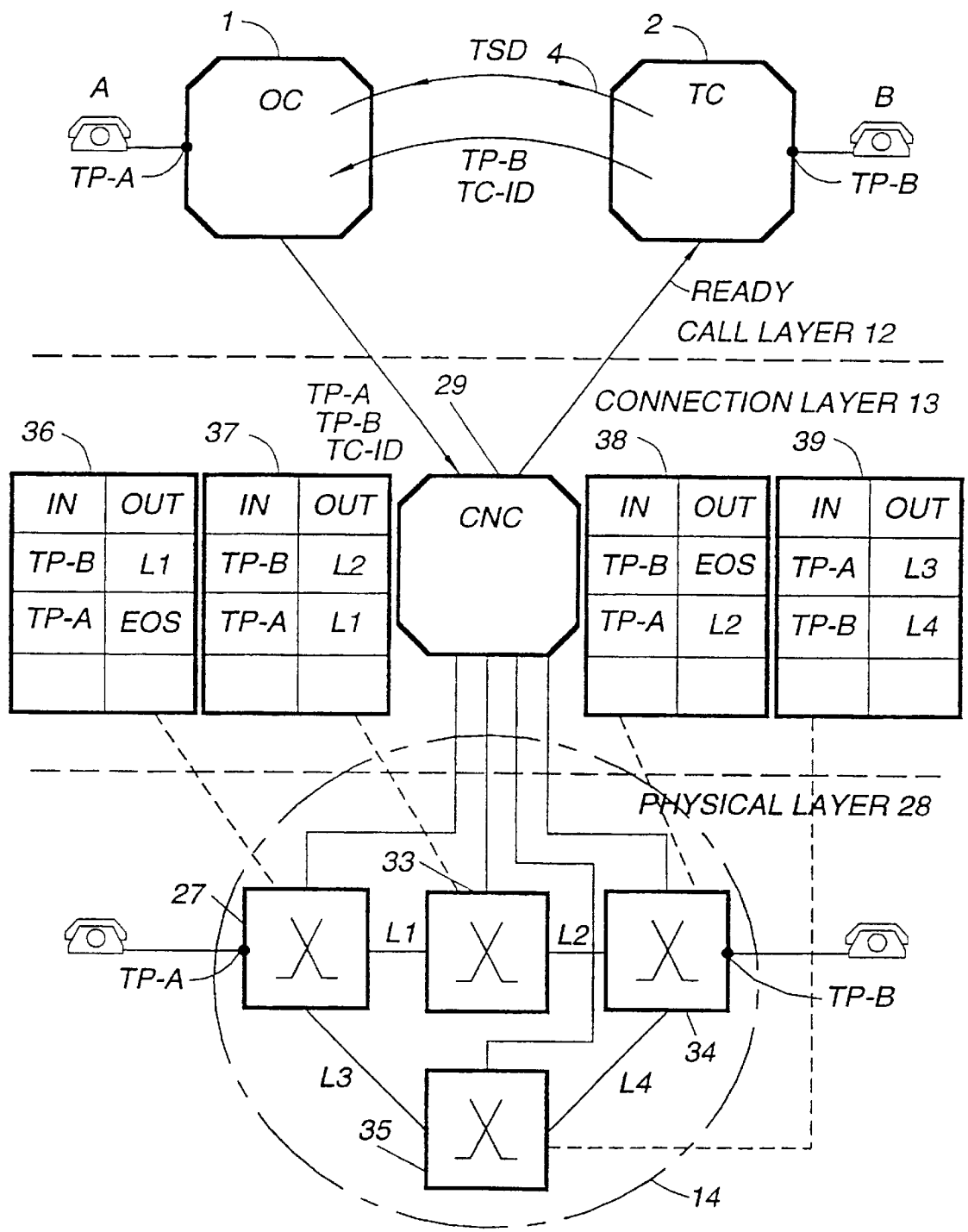
FIG. 7 is a block diagram illustrating a call between two users belonging to the same domain.
Figure 8:
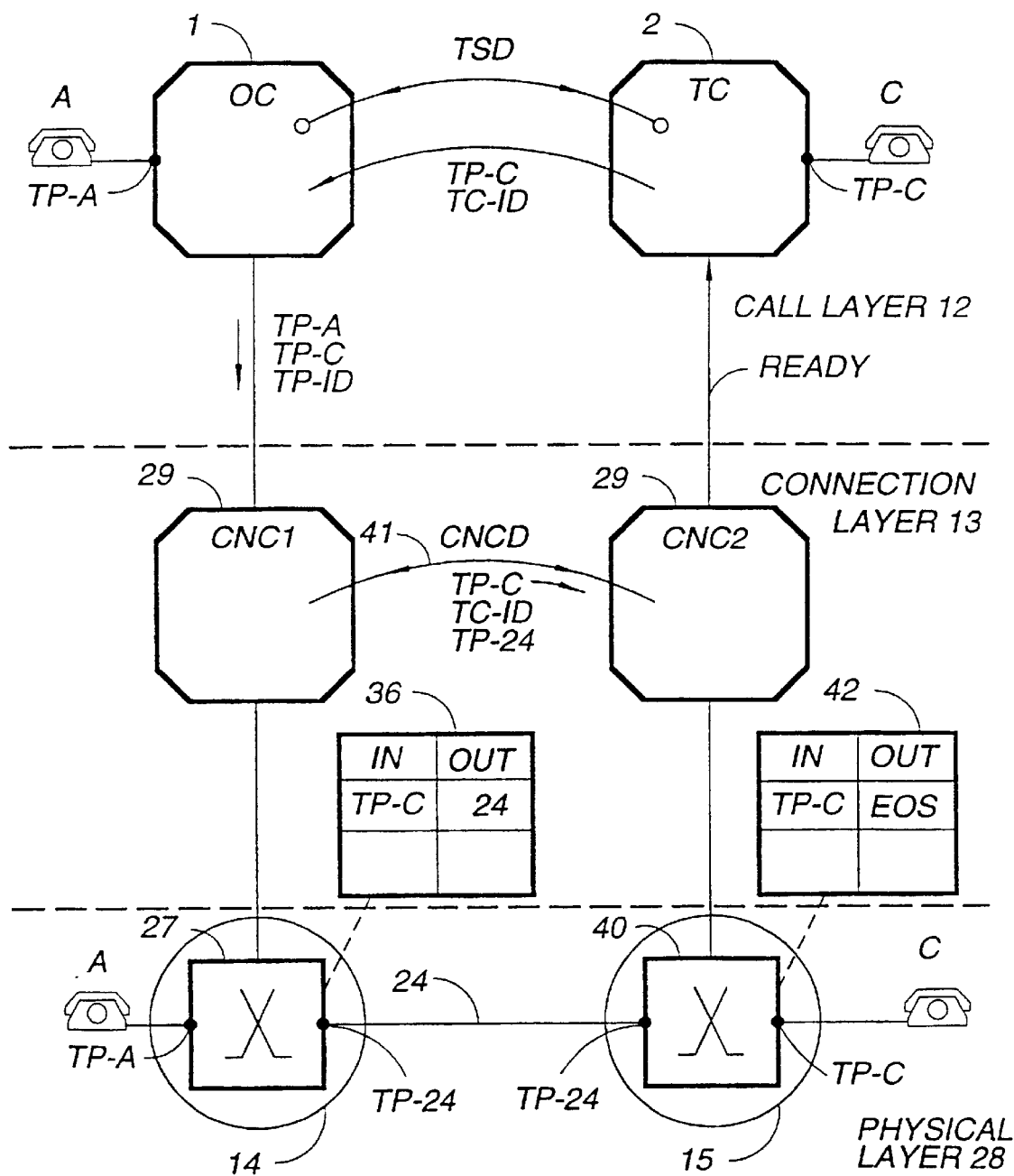
FIG. 8 is a block diagram of a call bridging two domains.

In FIG. 7 a situation is described when subscribers A and B are resident within the same domain 14. The domain 14 comprises several switches 27, 33, 34 and 35 interconnected with line L1, L2, L3 and L4 in the indicated manner. Subscriber A is resident in switch 27 and subscriber B in switch 34. When subscriber A goes off hook the OC process 1 is started. OC process 1 performs direction analysis in order to find out the domain in which subscriber B is resident. In this case process 1 starts process 2 over the TSD protocol 4 at the call layer 12. Process 2 signals TP-B to process 1 and marks subscriber B busy to other processes. Process 1 starts CNC process 29 and sends a connection request to it, said connection request comprising therein TP-A, TP-B and TC-ID. In order to set up the requested connection CNC process 29 performs routing analysis at each of the switches 27, 33 and 34 using routing tables. Simplified routing tables for each of the switches of domain 14 are indicated at 36, 37 38 and 39. As input data to the routing analysis in switch 27 the termination point TP-B is given and as output data link L1 to switch 33 is received. The CNC process 29 sets up a switch-internal connection from TP-A, through the switch 27 to a selected channel in the link L1. At switch 33 a new routing analysis is performed using as input data the same termination point TP-B. The link L2 is given as output data. A switch internal connection is set up in switch 33 between selected channels in L1 and L2. The call propagates to switch 34. At switch 34 routing analysis will return an EOS indication which means that subscriber B is resident in this switch. This is marked as EOS in routing table 38. The connection control process 29 knows the port in switch 34 at which the call arrived and it also knows the termination point TP-B. The connection control process 28 can therefore set up a switch-internal connection from link L2, through switch 34 to TP-B. Next CNC 29 sends a READY signal to terminating call process 2. Ring tone and ring signals are give to A and B. The connection between A and B has now been set up and A and B can speak to each other.

Accordingly, the way the processes 1 and 2 operate in FIG. 7 is identical with the way they operate in FIG. 6. Compared with FIG. 6 the connection control process 29 in FIG. 7 operates differently in that it repeats the routing analysis at each switch in the domain until the final switch is reached and in that it repeatedly sets up a switch internal connection in the switches in question.

In the next example subscriber A makes a call to subscriber C which is resident in a domain different from that to which A belongs. The situation refers to FIG. 4 and will be explained in detail with reference to FIG. 8. In order to concentrate the description it is assumed that domain 14 comprises just one switch, the switch 27, and that domain 15 comprises just one switch, labelled 40. To find out where the terminating call process 2 shall be created the OC process 1 performs the direction analysis described above. Next the OC process 1 signals to the identified domain in which the call to C should be terminated. Upon receipt of said signalling a TC process 2 is created in domain 15. Like in the previous examples there is an end-to-end signalling between the OC process 1 and the terminating call process 2 at the call layer 12.

The TC process 2 checks to see if C is free or if C is already engaged in a telephone call. In the latter case the call is terminated. For the sake of the example it is assumed that subscriber B is free. The TC process 2 will signals this to the originating process 1 and includes in said signalling the termination point TP-C of the called subscriber as well as its own identity TC-ID. Now everything is ready for connection set up and OC process 1 will create CNC process 29, labelled CNC1, and sends to it a request for set up of a call. In the request the terminating points TP-A, TP-C and TC-ID are included.

Upon receipt of the request CNC1 process 29 starts routing analysis using the routing table 36 associated with switch 27. Since the example is different from that of FIG. 7 contents of routing table 36 is different. As input data to the routing analysis the termination point TP-C of subscriber C is given and the routing table indicates that there is a trunk line 24 which should be used for the call to C. Having found that the connection shall be transferred to another domain, the CNC1 process selects a free channel in the trunk line 24. The selected channel is assigned an identity; termination point TP-24. As an The selected channel is a time slot in a periodically repeated frame structure. Next the CNC1 process sends a connection request to domain 15. The connection request creates and starts a similar connection control process 29, labelled CNC2 in FIG. 8, in domain 15. The connection request is sent over a connection control dialogue 41, abbreviated CNCD. The connection control dialogue CNCD 41 is a protocol that is used at the connection layer 13. The connection request comprises TP-C, TP-24 and TC-ID. Accordingly the identity of the selected channel is transferred to CNC2. Like all CNC processes 29 CNC2 process performs routing and finds that subscriber C is resident in its associated switch 40; indicated by EOS in routing table 42 associated with the switch 40. The CNC2 process next connects TP-24 with TP-C. Next CNC2 process sends the READY signal to the identified terminating call process 2. Ring tones and ringing signals are sent. Subscribers A and C now communicate.

Many variants of the above examples are conceivable. For example the TC process 2 can send ring signals to subscriber C while OC process 1 sends a ring tone to subscriber A. Still a variant is that TC process 2 sends ring signal to subscriber C and ring tone to subscriber A.

Refer to FIG. 4. The next example to be described is when subscriber A makes a call to subscriber D and the call extends over the three domains 14, 16 and 17. The way the call is set up will be described in connection with FIG. 9. In order to concentrate the description it is assumed that domain 14 comprise just one switch, switch 27, that domain 16 comprises just one switch 43 and that domain 17 comprises just one switch 44. Subscriber D has a termination point TP-D in switch 44. As described above the OC process 1 performs direction analysis, finds domain 17 in which subscriber D is resident, signals to this domain on an end-to-end basis and starts the TC process 2. As usual this signalling takes place over the TSD protocol 4. TC process 2 checks the state of subscriber D. For the sake of the example it is assumed that subscriber D is unoccupied. The TC process 2 will next signal TP-D and its own identity TC-ID to OC process 1. OC process 1 now creates a CNC process 29, labelled CNC1 in the drawing, and sends a request for set up of a call, also referred to as a connection request, to CNC1. The CNC1 process performs routing analysis and finds that a call having TP-D as destination should use the trunk line 25. The CNC1 process seizes a free channel in the trunk line 25 and assigns an identity, TP-25, to the selected channel. Next CNC1 sets up a connection from TP-A, through switch 27 to the seized channel in the trunk line 25 and sends a connection request to its adjacent domain 16 in which a new CNC process 29, labelled CNC2, is started. The connection request comprises TP-D, TC-ID and TP-25. The CNC2 process 29 performs routing analysis and finds that the connection should use trunk line 26. The CNC2 process 29 performs routing analysis, seizes a free channel in the trunk line 26, assigns an identity, TP-26, to the seized channel, establishes a connection from TP-25, through switch 43 and to TP-26 and sends a connection request to domain 17. The connection request comprises TP-D, TC-ID and TP-26. In domain 17 a CNC process 29, labelled CNC3, is created in response to the receipt of the connection request.

It should be observed that the CNC1 and CNC2 processes do not need to know the exact position of TP-D; it is sufficient to know the direction to TP-D. The connection requests from CNC1 to CNC2 and from CNC2 to CNC3 is sent over the CNCD dialogue 41.

The CNC3 process 29 in its turn performs routing analysis and finds that TP-D belongs to its associated switch 44. The CNC3 process 29 sets up a connection between the sized channel in trunk line 26 and TP-D. The call has now been set up between A and D. The CNC3 process reports this to TC process 2 by the READY signal. Ring tones and ring signals ones are sent to A and B and when B lifts the receiver A and B can communicate.

Figure 9:
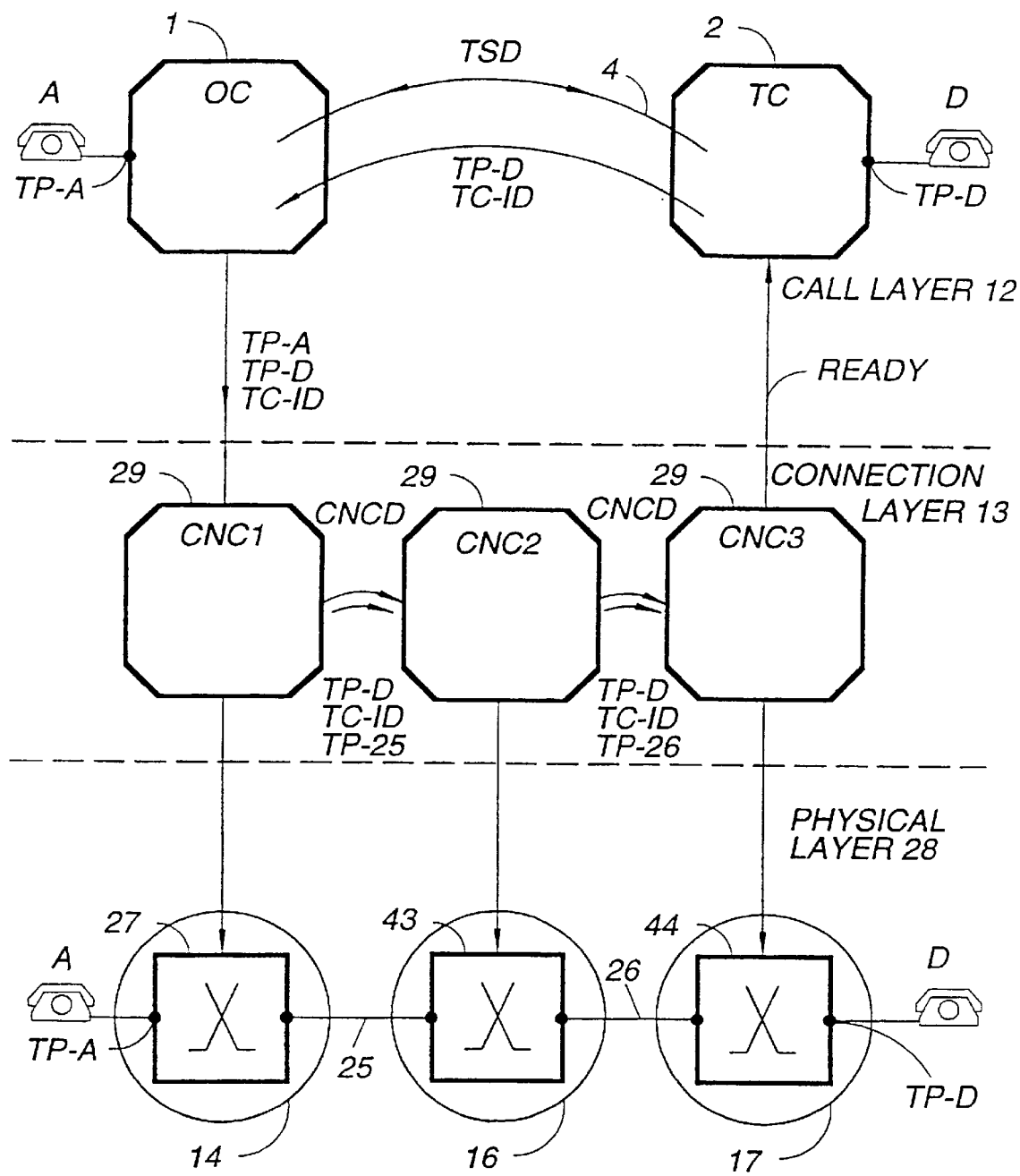
FIG. 9 is a block diagram illustrating a call that ranges over several domains.
Figure 10:
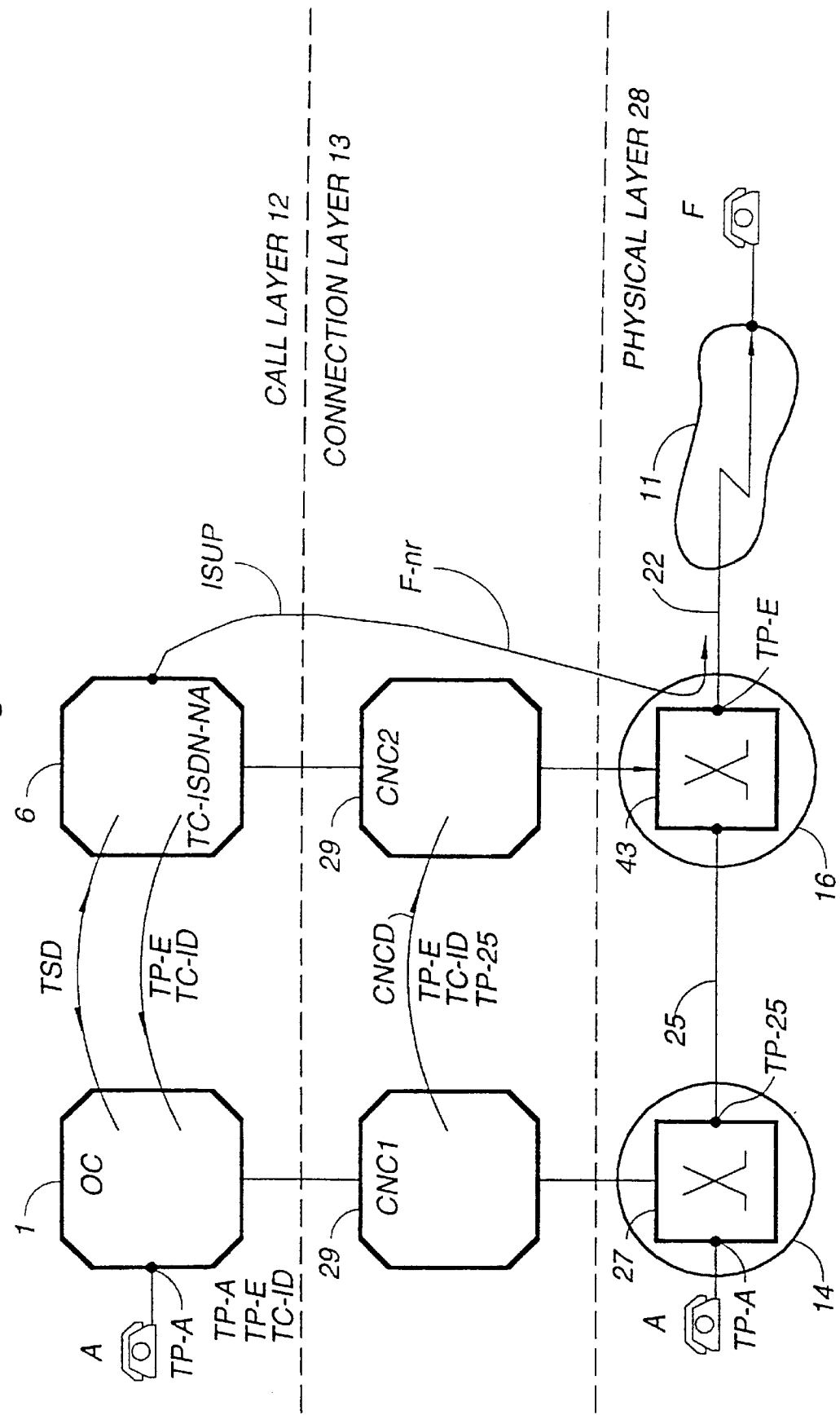
FIG. 10 is a block diagram of a connection to be terminated by an external network.

In the simplified example given in FIG. 9 each domain comprises just one switch. Normally a domain comprises several switches and in such a case the call is set up through the domain using the methods described in connection with FIG. 7.

Refer to FIG. 4. The next example to be described is when subscriber A makes a call to subscriber F which is resident in the external network 11. The way such a call is set up will be described in connection with FIG. 10. In order to concentrate the description it is assumed in this example that domain 14 comprises one switch 27 and domain 16 comprises one switch 43. The external network 11 is in this example an ISDN network. From connection point of view the connection to be set up between A and F will go from the CCS network 10 to the external network 11 and would therefore in a sense be an inhomogeneous connection, but from service point of view all signalling required to set up the connection and to administer the services required in the call will take place within the network 10 and therefore, by the definition given above, the connection is homogeneous.

The routing tables used in the CCS network 10 do not comprise information on the location of subscriber F but comprise information on a trunk 22 which goes from network 10 to the external network 11. When the OC process 1 receives the results from the direction analysis which it has ordered it will realize that the dialled b-number is outside the CCS network 10. The dialled b-number is the catalogue number of the terminating subscriber F. Instead of creating a TC process 2 of the type "subscriber access" it will create a TC process 6 of the type "network access" which signals to the external network using the ISUP signals. The TC process is labelled TC-ISDN-NA in FIG. 10. When TC-ISDN-NA process 6 has been started it will return the terminal point of the outgoing trunk that leads to the external network 11. This terminal point is referred to as TP-E and will be returned to the OC process 1. ISDN-NA 6 marks this termination point TP-E as occupied to other processes. OC process 1 next creates a CNC process 29, labelled CNC1, and sends a request to set up a connection. The request comprises TP-A, TP-E and the identity TC-ID of the TC-ISDN-NA 6 process. The CNC1 process 29 starts routing analysis and learns that a connection should be set up to domain 16. The CNC1 process 29 selects a channel in trunk line 25, assigns TP-25 to the selected channel, establishes a connection from TP-A to TP-25 through the switch 24 and sends a new connection request to domain 15. This will start a new CNC process 29, labelled CNC2 in the drawing, in domain 16. This connection request is sent over the connection control dialogue CNCD dialogue 41 and includes the termination point TP-E, TC-ID and TP-25. The CNC2 process 29 starts routing analysis and finds that a connection should be established to trunk line 22 which leads out from the CCS network 10. The CNC2 process 29 selects a channel in trunk line 22, assigns the identity TP-E to the selected channel, sets up an internal connection between TP-25 and TP-E in switch 43 and sends a READY signal to the TC-ISDN-NA process 6.

Next the TC-ISDN-NA process 6 signals subscriber F's catalogue number to the external network using the standardized protocol of the external network. The subscriber F's catalogue number is conventionally send embedded in an initial address message IAM. This address message IAM provides necessary information for routing the call to the ISDN-central office of subscriber F and for setting up a connection from termination point TP-E, through the external network 11 and to subscriber F. The routing in the external network is conventional and will use as input data to the routing analysis the catalogue number of subscriber F. The signalling between the external network and the TC-ISDN-NA process takes place in a channel in the trunk line 22 different from the channel used by the connection. This is symbolized by the curved arrow. The signalling follows standardized common-channel signalling principles.

Next a connection will be set up between TP-E and subscriber F in the external network. Conventional signalling will take place between the external network and the TC-ISDN-NA process 6 during establishment of the connection.

The above example is simplified. As described in connection with FIG. 4 a domain may comprise several switches. If the external network is PSTN, then the TC-NA process 6 would be labelled TC-PSTN-NA. The TC-PSTN-NA process would be a network application for PSTN and would signal to the PSTN network and would use the TUP protocol.

Refer to FIG. 4. The next example to be described is the set up of an inhomogeneous call between subscriber A and subscriber H using the external network 11 as an intermediary network for connection establishment. The way the inhomogeneous call is set up will be described in connection with FIG. 11. Also in this example it is assumed that the external network 11 is an ISDN network. Further, it as assumed that there is just one switch 27 in domain 14, one switch 43 in domain 16 and one switch 45 in the satellite domain 18.

As explained above the satellite domain 18 is part of the CCS network 10 and therefore domain 18 is contained in the direction tables as well as in the routing tables associated with the homogeneous network 19. Also, the routing and direction tables associated with domain 18 contain information on the homogeneous network 19. In domain 18 routing takes place in the same manner as described in connection with FIGS. 7–9. However, the routing tables of the CCS network 10 cannot be used to route a call through the external network since the external network cannot route calls based on termination points, as the CCS network 10 does. Further, the external network does not use the CNCD process and the TSD signalling protocol to set up a connection. The external network routes calls based on their respective b-numbers. So, in order to route a call from the exit point of the homogeneous network 19, through the external network 11 and to the entry point of domain 18 a method must be devised by which a connection, which supports services unknown to the external network, can be propagated through the external network. The new method proposed in accordance with the invention uses the processes described before but some of them have been redesigned in order to allow for set up of inhomogeneous connections.

Subscriber A lifts his receiver and dials the number to subscriber H. Everything starts as previously described. OC process 1 starts TC process 2 in domain 17. TC process 2 detects that subscriber H is associated with termination point TP-H and that subscriber H is not busy. Termination point TP-H and the identity TC-ID of the TC process 2 are transmitted to OC process 1 over the TSD protocol 4. The OC process 1 starts the CNCl process 29 and sends a to it a request to set up a call. The request comprises TP-A, TP-H and TC-ID. The CNCl process 29 requests routing analysis as usual and detects that the call must be routed to domain 16 using outgoing trunk line 25. The routing table used by the CNCl process is shown at 36. In order not to blur the drawing the routing table is shown below switch 27. The routing table, however, belongs to the connection layer 13.

Next CNCl process 29 selects a channel in the outgoing trunk line 25, assigns an identity, TP-25, to the selected channel, sends a connection request to domain 16 and sets up a connection from TP-A to TP-25 through the switch 27. The connection request will start a new CNC process 29, labelled CNC4 in the drawing, in domain 16. The connection request is sent over the CNCD dialogue and contains TP-H, TC-ID and TP-25. The CNC4 process performs routing analysis using routing table 46. As a result of this routing analysis the CNC4 process finds that subscriber H is not within domain 16 but within domain 18 and that an ISDN application shall be used for the connection. Accordingly an ISDN network access application of the kind shown at 6 in FIG. 2 should be used as a terminating call process. When the CNC4 process learns from the routing analysis that the destination address sits in satellite domain 18 the CNC4 process will send a connection request to domain 18. The connection request is sent over a modified connection control dialogue CNCD+ 47. The CNCD+ dialogue takes place at the connection layer 13. The plus sign indicates a modification of the CNCD dialogue 41. The connection request comprises the destination, TP-H, of the requested connection as well as the identity, TC-ID, of the TC process 2 associated with the requested connection. The connection request will start a new CNC process 29, labelled CNC5, in domain 18. Over the CNCD+ dialogue the CNC4 process will request the CNC5 process to send back a routing number R-NR. The routing number will used to route the connection through the external network 11.

For the moment it is sufficient to say that the routing number is a number that can be used by the external network for routing of connections. In accordance with the invention the satellite domain 18 is allocated a number series in the number plan associated with the external network 11. The numbers of the allocated number series are called routing numbers. There are no subscribers allocated to said number series of routing numbers. To the external network the satellite domain will thus look like a node in the external network.

Routing numbers available for use are listed in a routing number list 48 available in the satellite domain. A routing number is occupied only during set up of a connection. When a routing number is in use it is marked as occupied in the routing number list. Once a connection has been set up with the routing number, the routing number is released and is marked as free in the routing number list. The "life time" or the time during which a routing number is active is thus short compared to the duration of a call.

Upon receipt of the request to send back a routing number the CNC5 process picks a free number in the routing number list, in this case routing number R-NO=22 and writes its own identity CNC5-ID at the corresponding entry of the list. This will indicate that routing number 22 has been reserved for a connection which is handled by the CNC5 process. Next the CNC5 process sends the routing number R-NR=22 to the CNC4 process over the CNCD+ dialogue 47.

Upon reception of the routing number the CNC4 process sends a connection set up message 50, over a TSD+ protocol, to the TC-ISDN-NA process 6. The plus sign indicates a modification of the TSD signalling protocol 4. The connection set up message 50 comprises, as usual, a b-number which in this case is the routing number R-NR=22, and a flag 51 the purpose of which will be explained later. The TC-ISDN-NA process 6 is started at the connection layer 13 in this case. The TC-ISDN-NA process 6 first selects a trunk line to the external network and then selects a free channel in the selected trunk line. In the example it is supposed that trunk line 22 is selected. The selected channel is assigned an identity; termination point TP-E. The TC-ISDN-NA process 6 sends the identity, TP-E, of the selected channel to the CNC4 process.

The CNC4 process now holds TP-H, TC-ID, TP-25, R-NO=22 and TP-E. The CNC2 process next sets up a connection from TP-25 to TP-E through the switch 43.

Next the TC-ISDN-NA process 6 signals an IAM message 52 to the external network 11 over a channel in trunk line 22. This signalling channel is different from the channel, TP-E, used for the connection as symbolized by the curved arrow. The IAM message includes the selected routing number R-NO=22 as destination number (b-number). The IAM message is sent using the ISUP protocol.

In the external network the switch connected to trunk line 22 will receive a connection request which is sent on the ISUP protocol. The external network will route the call to the node associated with routing number R-NR=22 which in this case is the satellite domain 18. The call will arrive to domain 18 on a channel in the trunk line 23. In domain 18 an OC-NA process 8 will start upon receipt of the IAM message. The OC-NA process 8 is in this case an ISDN network access application and is labelled OC-ISDN-NA in FIG. 11.

The first thing done by the OC-ISDN-NA process 8 is to check whether the received b-number is a routing number. This check is made using conventional b-number analysis. If the received b-number was not a routing number the OC-ISDN-NA process 8 behaves like a normal OC process 1. IF the OC-ISDN-NA process 8 finds, as it will do in this case, that the received b-number is a routing number it will search routing list 48 to find out the identity of process with which the received routing number is associated. In this case the list search will show that the received routing number is associated with the CNC5 process.

The OC-ISDN-NA process 8 and the TC-ISDN-NA process 6 will now exchange standardized ISDN signalling messages in order to set up a connection in the external network. The connection will arrive to domain 18 on a channel which has the identity TP-G. The OC-ISDN-NA process 8 will be given the channel identity TP-G in said signalling session. So, the OC-ISDN-NA process 8 will now be in possession of the following information: The incoming call in the identified channel pertains to routing number R-NR=22 and from the routing number list 48 the identity of the process that seised R-NR-22 is CNC5.

Next the OC-ISDN-NA process 8 signals to the thus identified CNC5 process and transfers TP-G to CNC5. The signalling takes place using the modified TSD+ protocol.

It should be noted that there is no need for the OC-ISDN-NA process 8 to signal the routing number to the CNC5 process because the CNC5 process has already this number.

In the CNC5 process there has now been established a relation between the incoming call at the identified channel, TP-G, and the requested connection to H. The CNC5 process now releases the routing number R-NR=22 by marking it as free in the routing number list 48.

The CNC5 process now performs routing analysis using routing table 49 associated with the satellite domain. Termination point TP-H is used as input to the analysis. The output of the analysis gives EOS as result. This indicates to the CNC5 process that the connection shall be terminated in domain 18, in particular in switch 45 thereof. The CNC5 process now knows that the end point has been reached. The CNC5 process sets up the connection between TP-G and TP-H and finally sends a READY message to the TC process 2. The OC process 1 and TC process 2 will interact and will send tone and ring signals respectively. An inhomogeneous connection is now completed between subscribers A and H.

As discussed in connection with FIG. 6 the order in which the connection is set up may be different. For example instead of setting up the connection between TP-G and TP-H upon receipt of TP-G the CNC5 process may reserve or mark these points as occupied to other processes before it sends the READY signal to the TC process 2. The actual set up of the connection will then take place either when subscriber H lifts the receiver or when the ring signals are signalled.

Figure 11:
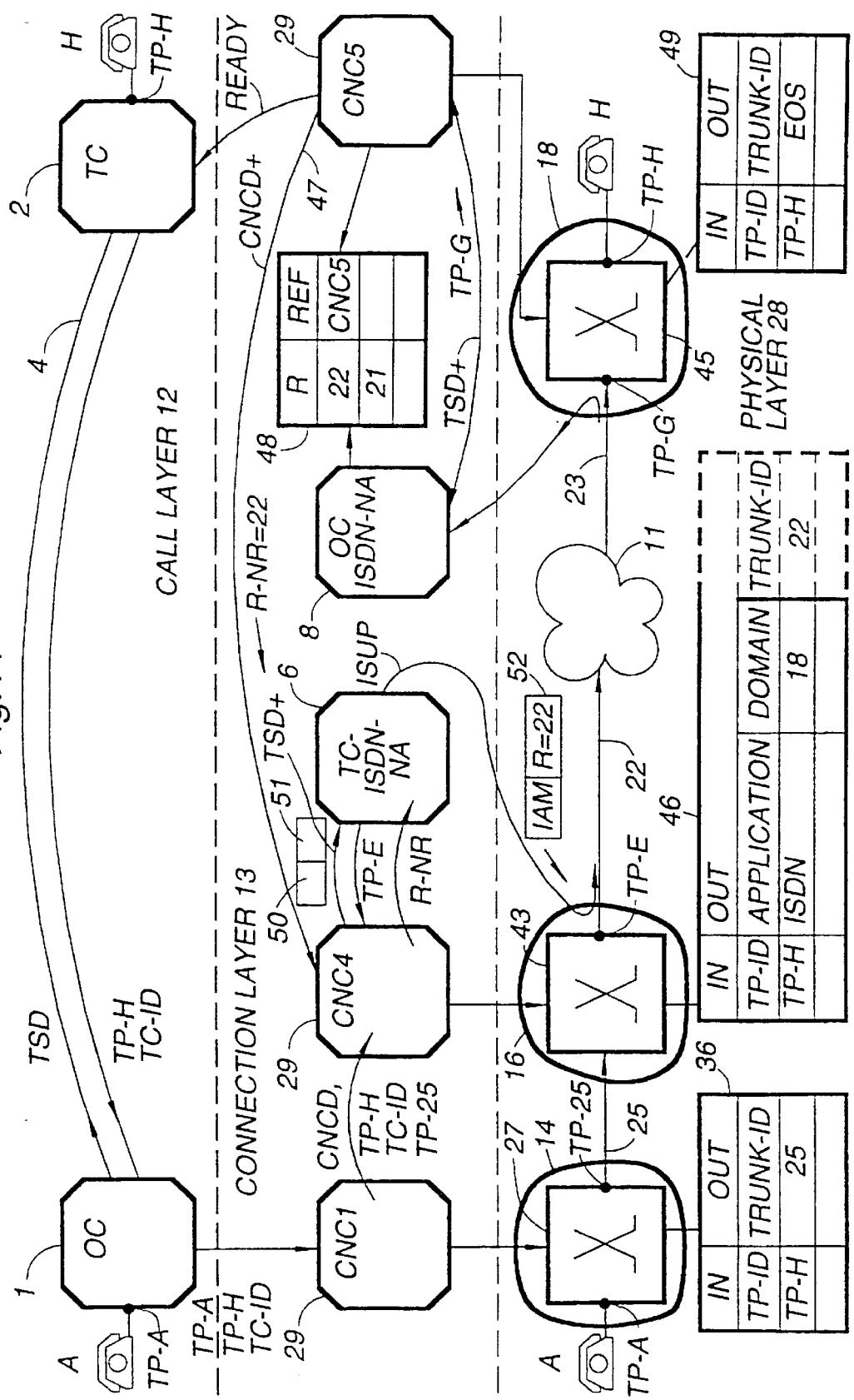
FIG. 11 is a block diagram of an inhomogeneous connection to be terminated by the inventive telecommunication network using an intermediary external network for transportation of the connection.

In the example described in connection with FIG. 11 the TC-ISDN-NA process 6 first selects a trunk line to the external network and then selects a free channel in the selected trunk line. As an alternative the CNC4 process receives information of the outgoing trunk line 22 as a result of a routing analysis. The routing table 46 would then comprise an additional column comprising information on the trunk to be used for a connection to the satellite domain. In FIG. 11 such a column has been indicated with a dashed line. The TC-ISDN-NA process just selects a free channel in the trunk pointed out by the extended routing table 46.

In the example described in connection with FIG. 11 it was assumed a call originated in the homogeneous network 19 and terminated in the satellite domain 18. To route the call via the external network 11 the satellite domain 18 was assigned a number series in the number plan of the external network. Suppose a call is made in the opposite direction. Such a call must also use the external network 11. In order to be able to route such a call through the external network it will be necessary to assign routing numbers, which belong to the external network, to the homogeneous network. In accordance with the invention the satellite domain will use one of said routing numbers to set up a call from said satellite domain to said homogeneous network via the external network.

Next the situation shown in FIG. 12 will be discussed. In this case there are just two switches 27 and 45 and a signalling net therebetween. There is, however, no homogeneous network 19 and no satellite domain 18. There are just two bare switches connected to the external network 11. The external network must be used for transport of a connection between the switches. Subscriber A is connected to switch 27 and subscriber I is connected to switch 45. The situation would for example arise when two system specification switches are inserted at two different places within an existing network.

Figure 12:
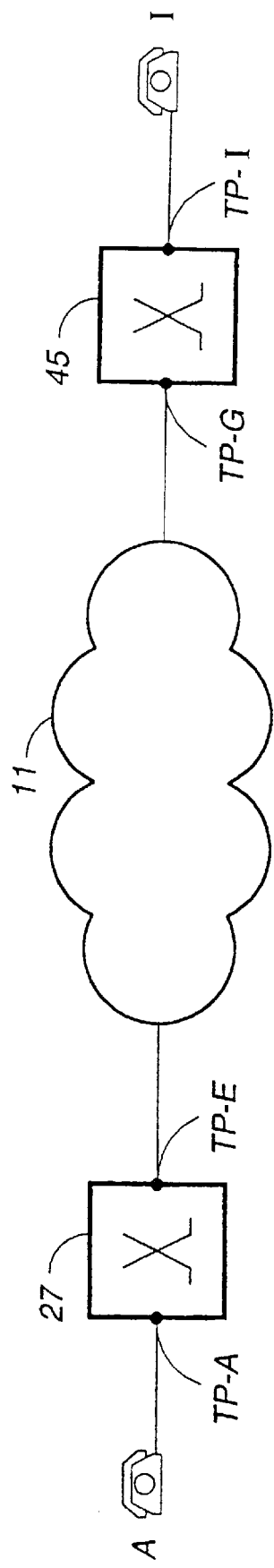
FIG. 12 is a block diagram illustrating an inhomogeneous connection which uses an external network for transportation of the connection.
Figure 13:
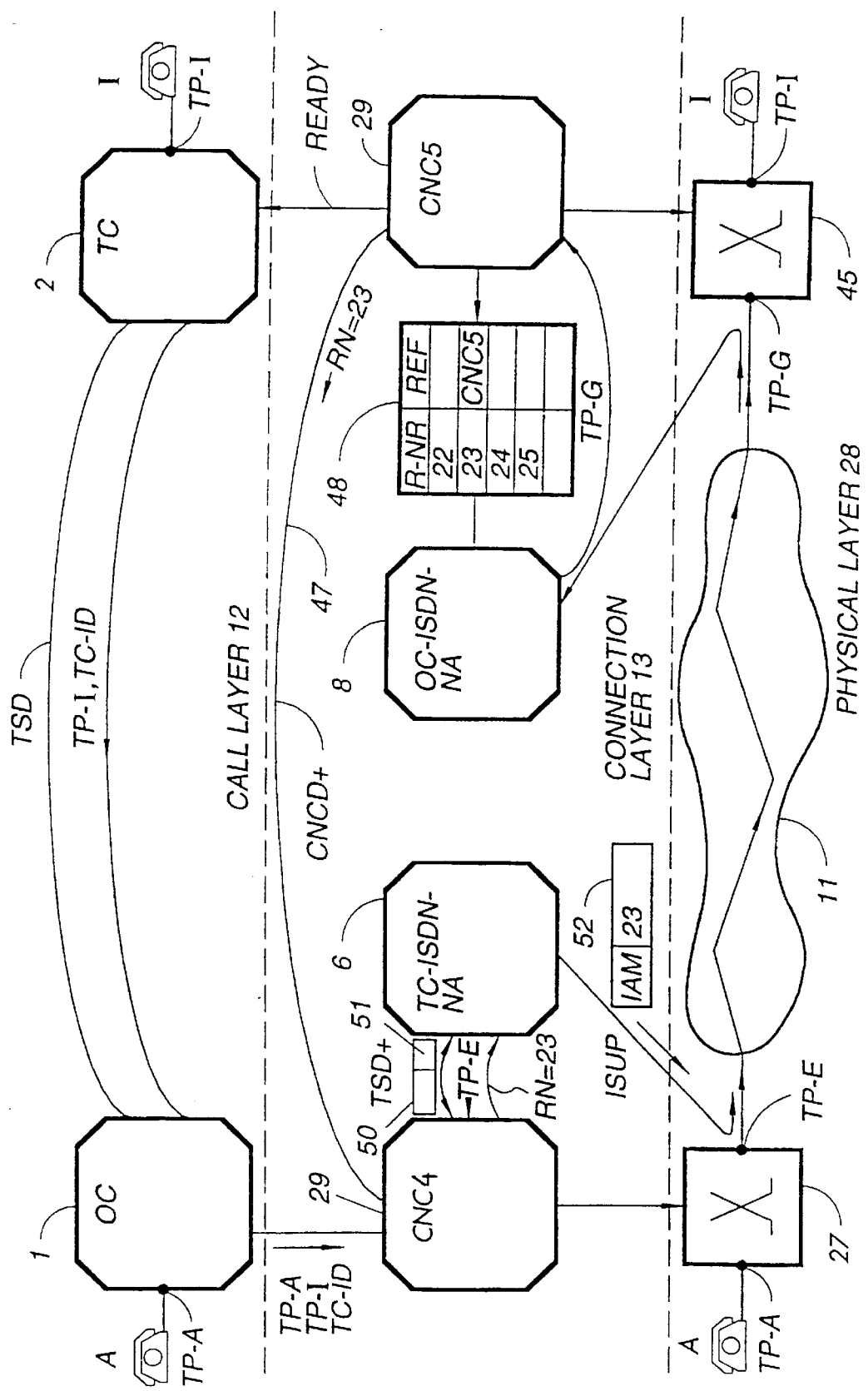
FIG. 13 is a block diagram illustrating in detail the set-up of an inhomogeneous connection of the type shown in FIG. 12.

Referring to FIG. 13 the procedures used to set up a connection between A and I in FIG. 12 are similar to those described in connection with FIG. 11 with the exception that OC process 1 will start the CNC4 process. The CNC4 process in its turn will start the CNC5 process over the CNCD+ dialogue 47. The CNC5 process will operate in the same manner as CNC5 process in FIG. 11 with the exception that it will fetch the routing number R-NR=23 and write its process identity CNC5 at the entry associated with routing number 23 in the routing number list 48. The CNC1 process will use the TSD+ protocol to start the TC-ISDN-NA process 6 and will set the flag 51 in the connection set up message 50. The TC-ISDN-NA process uses the ISUP protocol and includes in its IAM message the routing number R-NR=23. When the IAM message arrives to switch 45 the OC-ISDN-NA process will be started. Standardized ISDN signalling messages will be exchanged between the OC-ISDN-NA process and TC-ISDN-NA and a connection will be set up from TP-E to TP-G through the external network. The OC-ISDN-NA process will check if the received b-number is a routing number or not. In this case it is a routing number and therefore the OC-ISDN-NA process transfers the termination point TP-G to the CNC5 process. The CNC5 process performs routing analysis, receives as result thereof an EOS message and sets up connection through the switch 45. Now a connection has been established between A and I using the external network as a medium for connection establishment. The service and connection signalling between the two switches 27 and 45 will take place over the signalling network existing therebetween. Switch 27 belongs to domain 14 and switch 43 belongs to a further node, not shown in FIG. 5, of the signalling network 20.

In the above examples the requested service has been a regular telephone call using ISDN but of course many other types of connections may be set up using the same principles as described.

It should be noted that although ISUP protocol offers b-number transmission signalling as well as a service signalling the present invention does not use the ISUP protocol for service signalling. The service signalling in accordance with the invention takes place over the signalling network at the call layer 12.

The external network has been described as an ISDN network using the ISUP protocol. It can instead be a regular PSTN network in which case the TC-NA and OC-NA processes 6 and 8 will be using the TUP protocol.

Generally a TC process and an OC process executes at the call layer 12. Generally they also create a respective connection control process CNC 29 which execute at the connection layer 13. In FIGS. 11 and 13 the TC-NA and OC-NA processes execute at the connection layer 13 and must therefore be modified. In particular a TC-NA and an OC-NA process executing at the connection layer 13 shall not create a respective CNC process 29.

In accordance with the invention the TC-NA and OC-NA processes 6 and 8 in FIGS. 2 and 3 are modified to provide for routing number handling at the connection layer 13. The modified TC-NA and OC-NA processes are also used at the call layer 12 as conventional TC-NA and OC-NA processes 6 and 8. In accordance with the invention signalling to a modified OC-NA process and to a modified TC-NA process which both execute at the connection layer 13 takes place over the TSD+ protocol. The modified TSD+ protocol comprises the connection set up message 50 that has the flag 51. When the flag is set in the connection set up message 50 this instructs the TC-NA process to act in a certain way described below. The modified TC-NA process shall initiate functions for seizing (reserving) of a channel, for signalling the b-number to the external network and for sending back the termination point TP, TP-E in FIGS. 11 and 13, of the seized channel the to the CNC process.

The OC-ISDN-NA process 8 is a modified OC process, the modification being that it shall not start a TC process and that it comprises functions for handling of routing numbers.

The CNCD+ dialogue is equal to the CNC dialogue in that it sends all necessary information to a CNC process, such as termination point TP and identity of the TC process. In a CNCD+ dialogue a request for a routing number is sent to a connection process.

Assume a new service "call back" is introduced in the CCS network 10 in FIG. 4. It will be sufficient to introduce software for this service in each of the domains 14–18 if the intention is that every subscriber shall have access to this new service. If the intention is that only subscribers resident in domains 14 and 18 shall have access to this new service, then the software for the call back service is installed in domains 14 and 18 only.

This is possible because in-between domain 16 is used only for set up of the connection that requires the call back service and has necessary support, software and protocols, for accomplishing this task. The in-between domain 16 need not contain support for the call back service.

Figure 14:
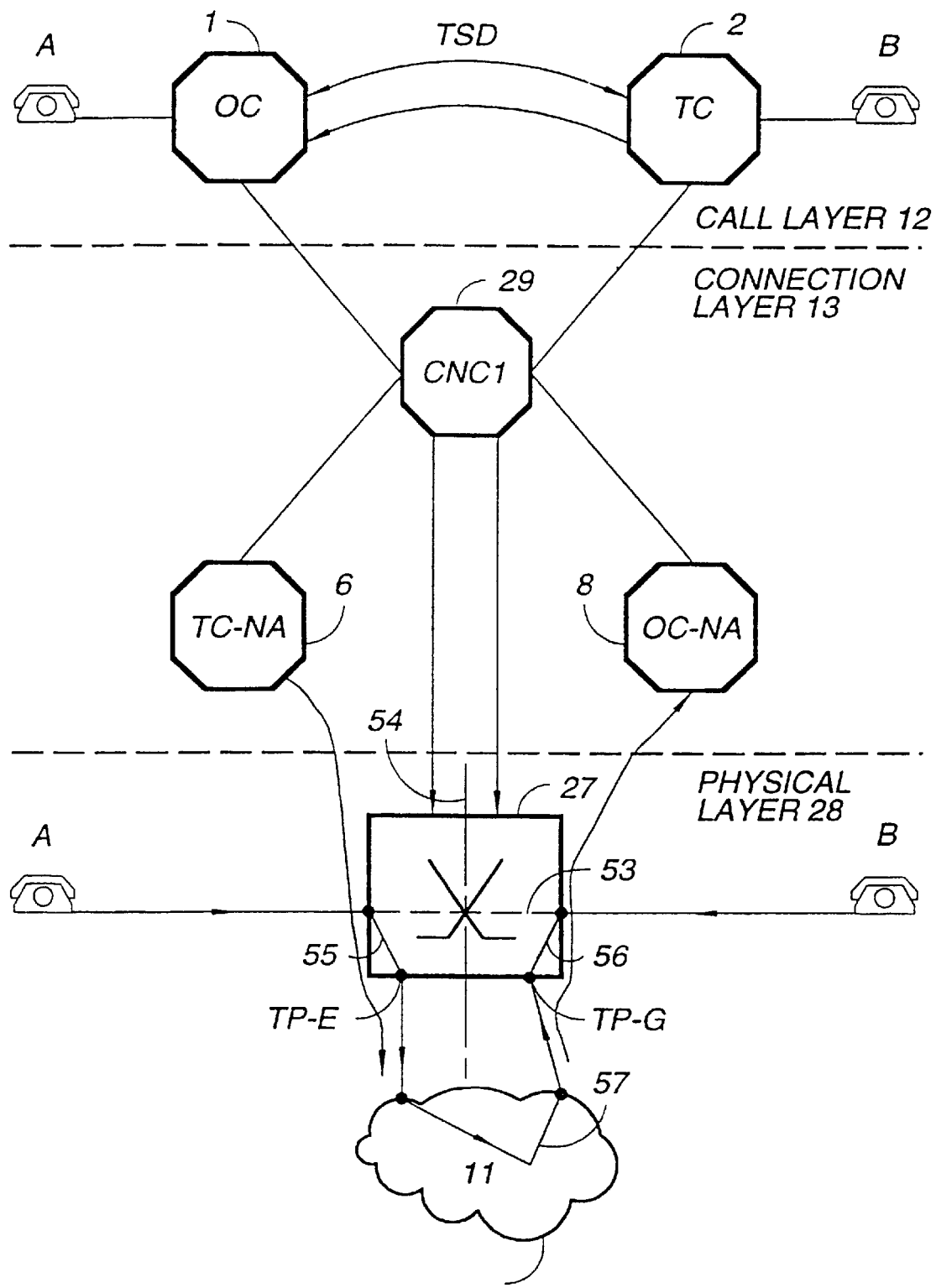
FIG. 14 is a block diagram of a switch wherein an external network is used to set up a connection through the switch.

In FIG. 14 an example of an inhomogeneous connection between subscriber A and subscriber B is shown. Both subscribers A and B belong to one and the same switch 27. Local law bans the set up of a direct, switch internal connection symbolized by dashed line 53. To understand the situation, imagine that the switch 27 is divided in two halves, as symbolized by the dashed and dotted line 54. To set up a connection between A and B the external network 11 must be used. In particular two switch internal connections 55, 56 must be created which in their turn are interconnected by a connection 57 in the external network in the manner shown in FIG. 14. There will thus be created an inhomogeneous connection and the principles shown in FIGS. 6, 11 and 13 are used to set up the connections. In particular there will be created an TC-NA process 6 and an OC-NA process 8 by the CNC process 29. Is the external network an ISDN network one TC-ISDN-NA process 6 and one OC-ISDN-NA 8 for set up of the connection between TP-E and TP-G. The CNC process 29 sets up the two switch internal connections 55 and 56. Like in FIG. 6 the CNC process 29 is created by an OC process 1 which over a domain internal signalling starts TC process 2. So, the principles indicated in FIG. 13, where the end point of the call is resident in two different domains, is applied also in the situation in FIG. 14 where the end points of the call is resident in one and the same exchange in one and the same domain. In FIG. 14 the process executing in the CNCl process 29 is divided into two processes, one corresponding to the CNCl process in FIG. 13 and the other corresponding to the CNC5 process in FIG. 13, although the CNCl process in FIG. 14 is executing in one and the same domain.

Figure 15:
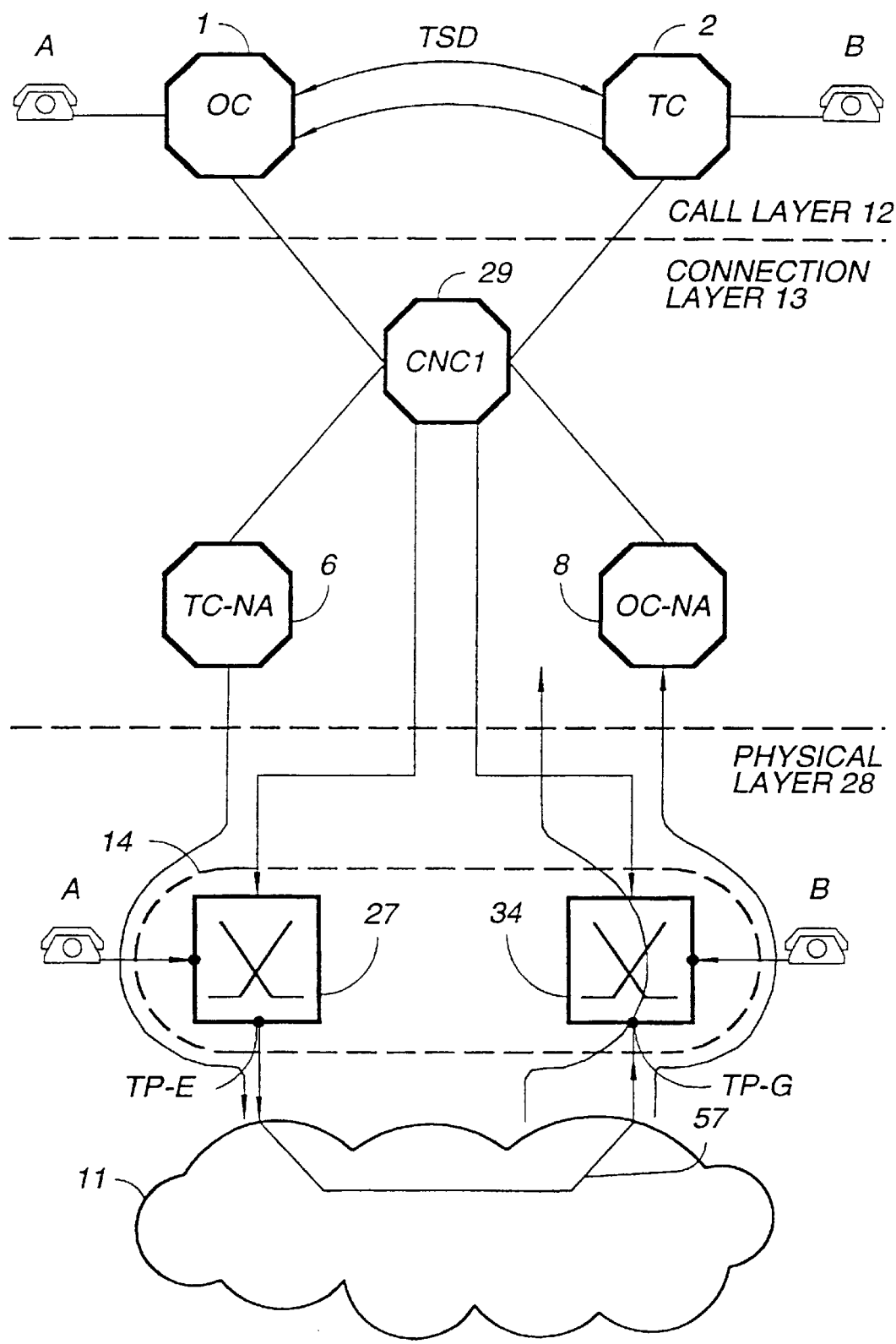
FIG. 15 is a block diagram of a domain wherein an external network to transport a connection through the domain.

A situation similar to that in FIG. 14 exists in FIG. 15 where subscriber A is served by switch 27 resident in domain 14 and subscriber B is served by switch 34 resident in the same domain 14 and where no direct connection can be used between the exchanges. Instead a call from A to B must be directed via the external network 11 and an inhomogeneous connection will result. Also in this case CNCl process will create a TC-ISDN-NA process 6 and an OC-ISDN-NA process 8 for use in establishing a connection between TP-E and TP-G in the external network 11. So, the principles indicated in FIG. 13, where the end point of the call is resident in two different domains, is applied also in the situation in FIG. 15 where the end points of the call is resident in one and the same domain.

Figure 16:
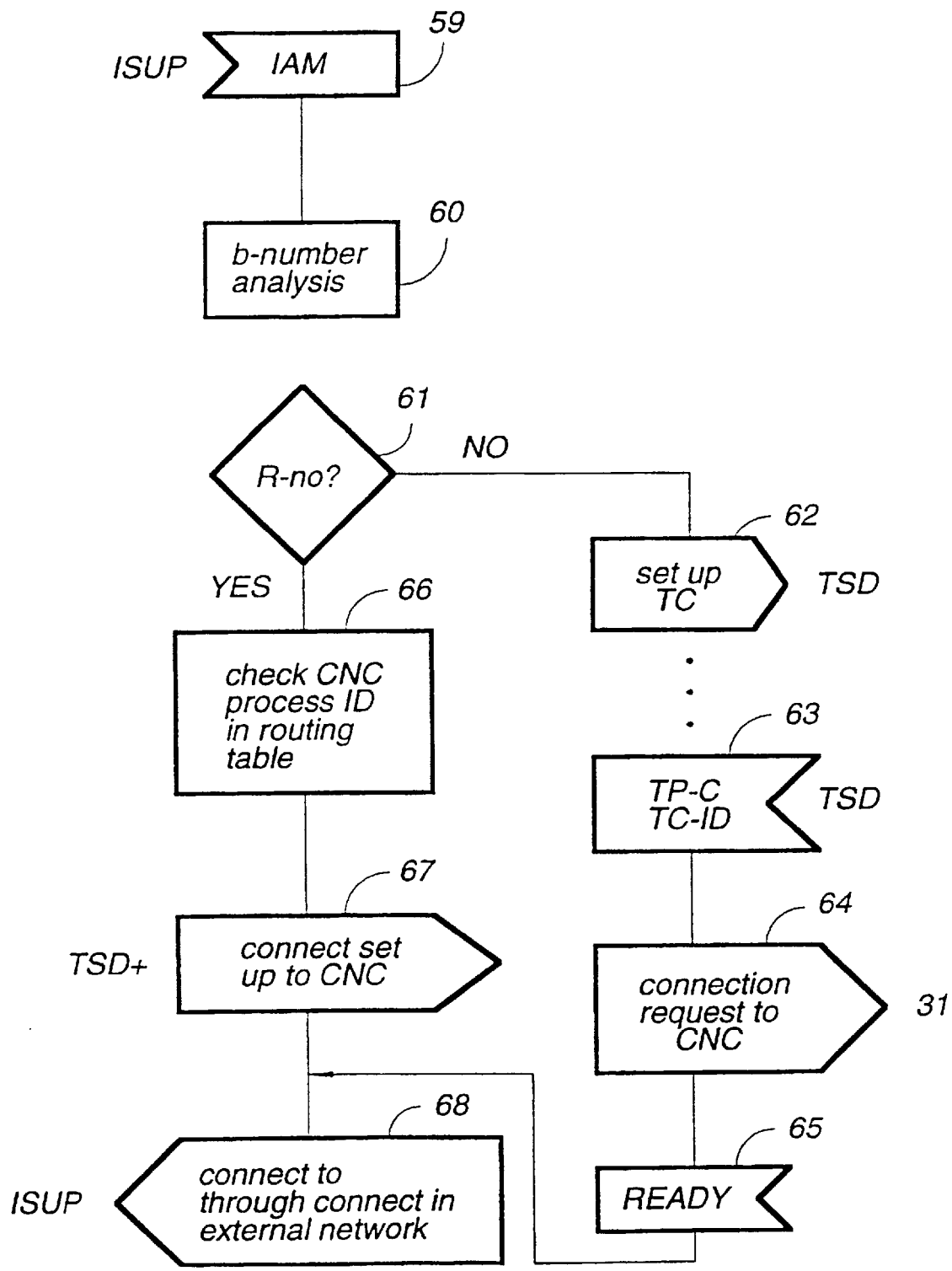
FIG. 16 is a flow diagram illustrating an originating call network access process.

FIG. 16 is a flow diagram that illustrates an OC-ISDN-NA process 18. After the OC-ISDN-NA process has been started it waits for an IAM message, box 59. When the b-number is received from the external network b-number analysis is made, box 60. The b-number analysis gives a result the service to be executed as well as the identity of the domain to which the call should be directed, referred to as direction analysis above. The next step, selection box 61, is to determine if the b-number is a routing number. If not, alternative NO, then a TC process 2 or a TC process 6 is started, box 62, and the b-number is signalled to it using the TSD protocol. Next, the OC-ISDN-NA process waits, box 63, for the termination point TP-X of the called subscriber X and the identity TC-ID of the started TC process 2. This information is sent using the TSD protocol. Upon reception of this information a connection request is sent to the CNC process 29, box 64. The OC-ISDN-NA process next waits for the connection to arrive and this event is detected upon reception of the READY signal from the TC process over the TSD protocol 4, block 65. Next a standardized signalling message is sent to the external network, box 68.

If the b-number was a routing number, alternative YES in selection box 61, then the identity of the CNC process with which the routing number is associated is checked, box 66. After finding which the connection process was, in FIG. 11 it was the CNC5 process, a set up message is sent to it, box 67, said set up message comprising the termination point, TP-G, of the channel used for the connection through the external network. This connection request is sent using the TSD+ protocol. Now everything is ready to set up a connection through the external network and OC-ISDN-NA process sends a standardized message, box 68.

Figure 17:
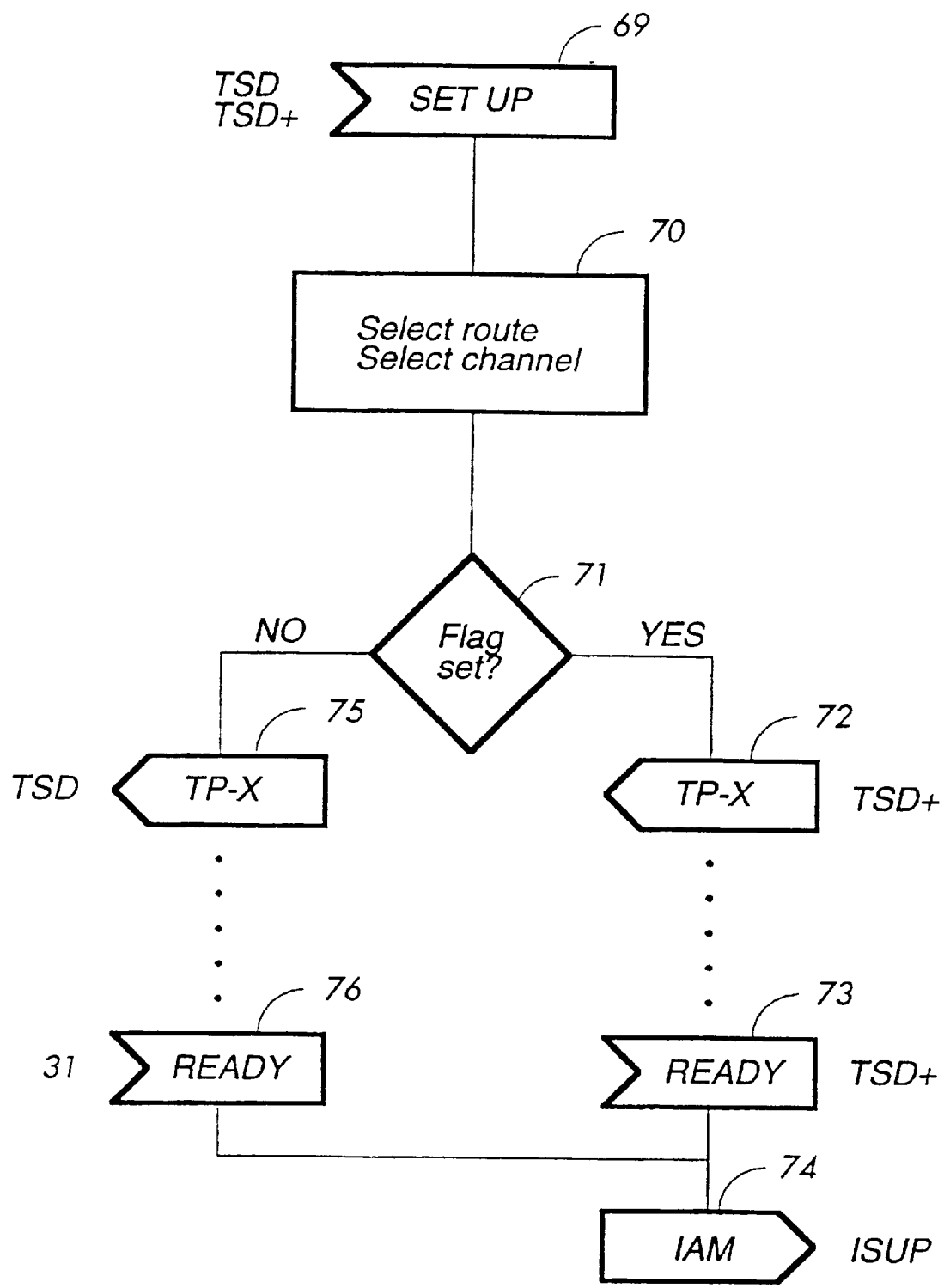
FIG. 17 is a flow diagram illustrating a terminating call network access process.

FIG. 17 is a flow diagram that illustrates the steps that execute in a TC-ISDN-NA process. A set up message 50 comprising the b-number of the called subscriber arrives either over the TSD protocol or over the TSD+ protocol, box 69. The set up message 50 is signalled over the TSD protocol if its flag 51 is not set. The set up message is signalled over the enhanced TSD protocol. Next the TC-ISDN-NA process selects an outgoing trunk and a channel in that trunk, box 70. Next the TC-ISDN-NA process tests the received message to see if the flag was set or not. If the flag was set, alternative YES in selection box 71 the termination point of the called subscriber is sent back, box 72, to the connection control process that started the TC-ISDN-NA process. Next the TC-ISDN-NA process awaits the arrival of a READY signal from its associated connection control process, box 73. The arrival of READY signal tells the TC-ISDN-NA process that its associated connection control process has set up a connection through is associated switch or domain. This READY signal arrives over the TSD+ protocol. When the READY signal arrives the TC-ISDN-NA process sends an IAM message in the selected channel, box 74. The IAM message is sent over the ISUP protocol.

If the flag 51 is not set, alternative NO in selection box 71, the TC-ISDN-NA process sends the termination point TP-X of the selected channel its own identity TC-ID to the OC process 1 or 8, box 75. Next the TC-ISDN-NA process awaits the READY signal, box 76. The READY signal is sent from the CNC process 29 over the protocol 32. Finally the TC-ISDN-NA process sends IAM signals to the external network, box 77.

Figure 18:
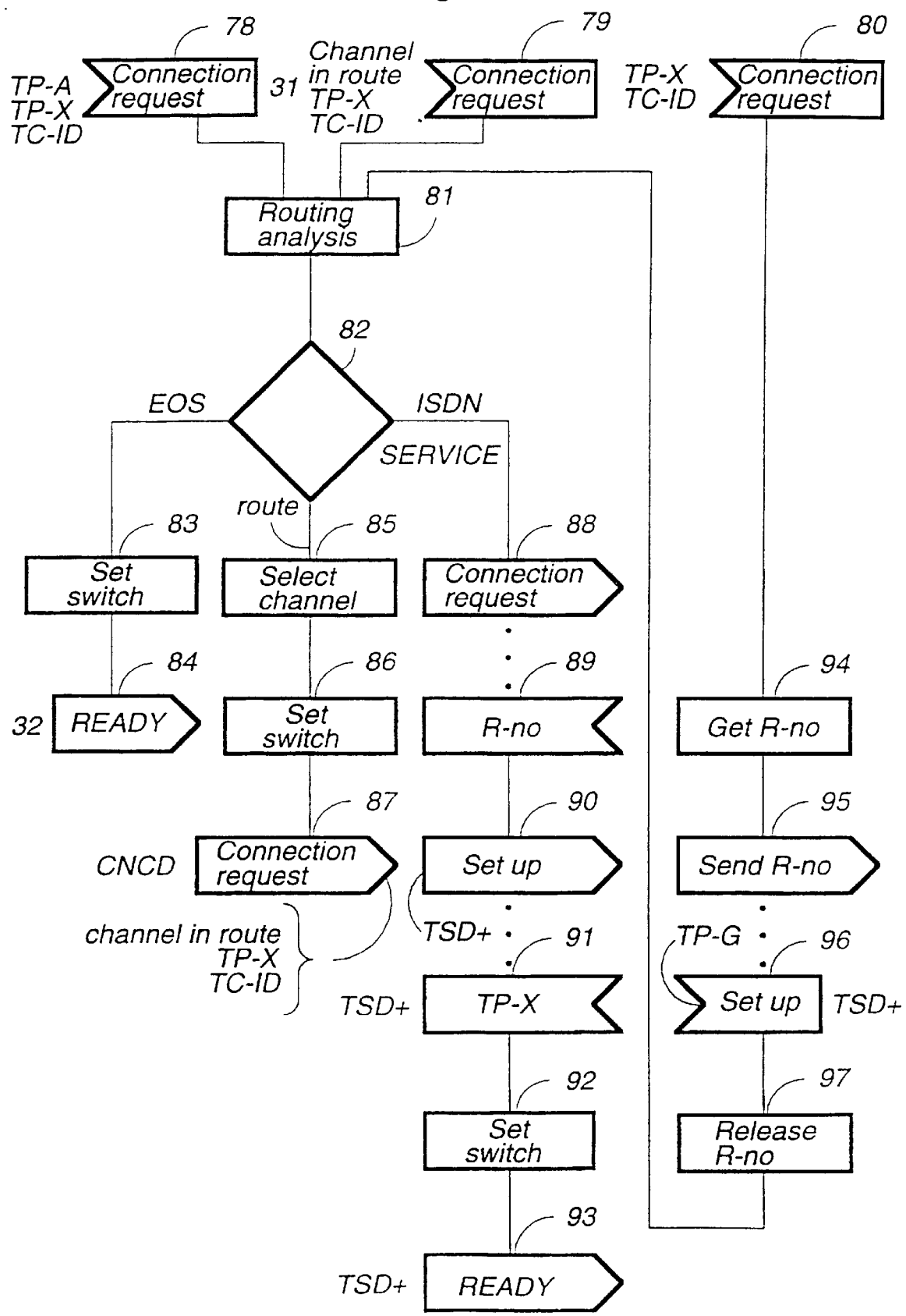
FIG. 18 is a flow diagram illustrating a connection control process used for establishment of an inhomogeneous connection.

In FIG. 18 the flow diagram of the CNC process 29 is shown. The CNC process is created in any of three different ways, as indicated by boxes 78, 79 and 80. Box 78 represents the case when a CNC process is started by an OC process in the same domain, box 79 represents the case when the CNC process is created by a CNC process in another domain by a connection request that uses the CNCD dialogue. Box 80 represents the case when a CNC process is started by another CNC process in another domain by a connection request that uses the CNCD+ dialogue. Information contained in the input arguments to the different operations in the connection control process are shown to the left of the boxes. To the right of the boxes the protocol over which the output signals from the different operations in the CNC process is shown.

After receipt of the connection request the CNC process starts routing analysis, box 81. Different situations arise depending on the result of the routing analysis. This is indicated in selection box 82. Three different results are possible; EOS end of selection, ROUTE, and ISDN SERVICE.

The result EOS, alternative EOS from selection box 82, represents the case when the connection shall terminate in a switch controlled by the CNC process. Accordingly, the associated switch shall be through connected, box 83. In the drawing this procedure is labelled "set switch". Following this a READY signal is sent, box 84, to the TC process, as represented by arrow 32 in FIG. 6.

The result ROUTE, alternative ROUTE at selection box 82, means the connection request shall be forwarded to an adjacent domain and the next operation is to select an outgoing trunk and a channel therein, box 85. Next the switch at which routing analysis was performed is "set", i.e. through connected, box 86. Finally a connection request is sent, box 87, to the adjacent domain over the CNCD dialogue. The information contained in this connection request is indicated to the right of box 87. This connection request is received at box 79 in the CNC process which then is started in the adjacent domain. Routing analysis, box 81, will then be made in the CNC process started in the adjacent domain.

The result ISDN-SERVICE, i.e. alternative ISDN SERVICE at selection box 82, means that a connection request is sent to start a CNC process in the destination domain, box 88. This connection request is sent over CNCD+ dialogue and it comprises the termination point TP-X of the called subscriber TC-ID, and a request for a routing number. Next the connection control process awaits reception of a routing number, box 89. Next a set up message 50, box 90, is sent over a TSD+ protocol to a TC-ISDN-NA process. The flag 51 is set in the message, indicating that the receiving TC-ISDN-NA process shall follow operations 72, 73, 74 shown in FIG. 17. As a reply to the connection request message the termination point TP of the selected channel is received, box 91, over TSD+ dialogue. Next the CNC process sets up a connection, "set switch" in box 92, through its associated switch. Finally a READY signal is sent over the TSD+ dialogue to the TC-ISDN-NA process, box 93. Now the TC-ISDN-NA process can sent its IAM message, process 74 in FIG. 17.

When the CNC process receives a connection request over the CNCD+ dialogue, box 80 in FIG. 18, the CNC process selects a free routing number, and associates its own identity with the selected routing number, box 94. Next the selected routing number is sent to the CNC process that requested it, box 95. The CNC process now awaits receipt of the termination point TP-G at which the connection through the external network arrives. This termination point is sent over the TSD+ dialogue from the OC-NA process 8, box 96. Next the selected routing number is released, box 97. Now routing analysis takes place, box 81, and depending on the result of the analysis the connection control process will now follow either the EOS alternative or the ROUTE alternative from the selection box 82.

The above description of the specific embodiments relates to set up of an inhomogeneous connection between two subscribers. The invention includes set up of an inhomogeneous connection between two computers involved in a session. Also within the spirit of the invention is the set up of an inhomogeneous connection between computer controlled terminal devices.

What is claimed is:

1. A call and connection separated network, comprising:
   a first switch,
   a second switch lacking a direct transmission connection with the first switch, said first switch having a concentration to an external network at a first termination point and said second switch having a connection to the external network at a second termination point,
   a first routing number table comprising first catalogue numbers which belong to a numbering plan of an external network but which are assigned to the second switch so as to route a call from said first switch to said second switch via the external network,
   a second routing number table comprising second catalogue numbers which belong to the numbering plan of said external network but which are assigned to the first switch so as to route a call from the second switch to the first switch via the external network,
   a signalling path extending between the first and second switches,
   at the originating side of a call:
      a first process for signalling, over the signalling path, service related information and the destination address of the call to the terminating side of the call,
      a second process in operative relationship with the first process for establishing a connection to said first terminating point and for requesting a routing number from the termination side of the call,
   at the terminating side of said call:
      a first peer process to said first process for signalling the termination point of said call to the first process,
      a second peer process to said second process, for selecting a routing number and for associating the selected routing number with its own identity,
   at the originating side of said call:
      a third process for signalling to the external network a request to set up a connection from the first terminating point, through the external network and to the second terminating point, said request containing as destination address of the requested connection in the external network the routing number associated with the second peer process,
   at the terminating side of said call:
      a third peer process to said third process for receiving the selected routing number and for sending the termination point at which it arrived to the satellite domain to said second peer process, and
   at the terminating side of said call:
      said second peer process upon receipt of said termination point from said third peer process establishing a connection through said satellite domain from said second terminating point to the termination point of the call, thus completing an inhomogeneous connection from the originating side to the terminating side of the call via the external network.

2. A call and connection separated network in accordance with claim 1, further comprising a first domain comprising said first switch and at least a third switch in which said call originates, said first process starting said second process, said second process upon receipt of the terminating point of the call and the identity of the first peer process starting routing analysis and setting up a connection for said call from said third switch through the first domain to said first terminating point.

3. A call and connection separated network in accordance with claim 1, further comprising a first domain comprising said first switch and a second domain comprising a further switch in which said call originates, said first process in said second domain starting a further second process, said further second process upon receipt of the terminating point of the call and the identity of the first peer process starting routing analysis and setting up a connection for said call from said further switch through said second domain to a trunk line that goes to said first domain, said further second process, when the routing analyses gives as result that the termination point of the call is located within said first domain, starting said second process in said first domain and providing it with the terminating point of the call and the identity of the first peer process.

4. A call and connection separated network in accordance with claim 3, said second process upon receipt of said terminating point of the call and the identity of the first peer process starting routing analyses, said second process starting said third process when the routing analyses gives as result that the termination point of the call is located within said first domain.

5. A call and connection separated network in accordance with claim 4, further comprising domains together with said first and second domains forming a homogeneous network, each domain comprising at least one switch, one further second process being provided for each further domain and each connection, each further second process as well as each second process being a connection control process controlling the switches of its associated domain, a connection control process of one domain communicating to a connection process of an adjacent domain on said connection layer using a second protocol.

6. A call and connection separated network in accordance with claim 1, wherein said first process is a subscriber originating call process, said first peer process is a subscriber terminating call process, and said first process communicates with said first peer process on said call layer using a first protocol.

7. A call and connection separated network in accordance with claim 6, wherein said first protocol comprises functions by which the first process starts the first peer process, functions for transferring destination address of said call from the first process to the first peer process, for transferring the termination point of the call from the first peer process to the first process, functions for transferring the identity of the first peer process from the first peer process to the first process, and functions by which the first process starts the second process at the connection layer and by which the first process sends a connection request to the second process together with the terminating point of the call and the identity of the first peer process.

8. A call and connection separated network in accordance with claim 7, wherein there are several domains forming a homogeneous network, each domain in the homogeneous network comprising at least one switch there is one second process for each domain and each connection, each second process is a connection control process controlling the switches of its associated domain, a connection control process of one domain communicating to a connection process of an adjacent domain on said connection layer using a second protocol.

9. A call and connection separated network in accordance with claim 8, wherein said second protocol has functions for starting a new second process, functions for transferring to the new started second process the termination point of the call, the identity of the first peer process and the termination point of the seized channel.

10. A call and connection separated network in accordance with claim 9, wherein said functions of the second protocol are activated if the routing analysis gives as result, that the termination point of the call is located within another domain within the homogeneous network.

11. A call and connection separated network in accordance with claim 10, wherein said started second process has functions to start, over a modified first protocol, said third process if the routing analysis gives as result that the destination address is located within said call and connection separated network but outside the homogeneous network, and that said third process is started on the connection layer.

12. A call and connection separated network in accordance with claim 11, wherein said modified second protocol comprises the same functions as the second protocol with the addition of functions to signal to a second peer process a request to obtain a routing number.

13. A call and connection separated network in accordance with claim 12, wherein said second process over said modified first protocol
  (i) sends to the started third process a message comprising the selected routing number, and
  (ii) sets a flag in said message to indicate to the third process that it should act on the connection layer.

14. A communications network in accordance with claim 13, wherein said third process is a network access terminating call process used to set up of a connection in the external network.

15. A call and connection separated network in accordance with claim 14, wherein the first process at the call layer includes the functions of the third peer process at the connection layer, so as to form a first generic process that is used as said first process at the call layer and as said third process at the connection layer.

16. A call and connection separated network in accordance with claim 15, wherein the first peer process at the call layer includes the functions of the third process at the connection layer so as to form a second generic process that is used as said first peer process at the call layer and as said third process at the connection layer.

17. A call and connection separated network in accordance with claim 16, wherein the second peer process is a connection control processes that selects said routing number from a group of routing numbers which belong to the numbering plan of the external network and which the external network has assigned to the domain receiving the call.

18. A call and connection separated network in accordance with claim 17, wherein said second peer process associates its own identity with the routing number it selects.

19. A call and connection separated network in accordance with claim 18, wherein said group of routing numbers is assigned to the satellite domain.

20. A communications network in accordance with claim 19, wherein said satellite domain creates said third peer process upon receipt at second termination point of said message from the external network.

21. A call and connection separated network in accordance with claim 20, wherein said third peer process compares the routing number included in said message with the group of routing numbers assigned to the terminating side and, when there is a match, reads the identity of second peer process that selected the routing number and sends to the identified second peer process and second termination point at which the call that contained the routing number arrived.

22. A call and connection separated network in accordance with claim 21, wherein said second peer process starts routing analysis upon receipt of said second termination point.

23. A call and connection separated network in accordance with claim 22, wherein said second peer process sets up a connection from the second termination point to the termination point of the call if the routing analysis gives as a result that the termination point of the call is within the domain controlled by the second peer process.

24. A call and connection separated network in accordance with claim 23, wherein said second peer process sets up a connection from the second termination point through the domain controlled by the second peer process and to a trunk that goes to an adjacent domain, and sends, over the second protocol, the termination point of the call, the identity of the first peer process and the termination point of the seized channel in said trunk to said adjacent domain if the routing analysis gives as a result that the termination point of the call is outside the domain controlled by the second peer process.

25. A call and connection separated network in accordance with claim 24, wherein said second peer process, after set up of the connection to the termination point, sends a READY signal to the first peer process, said READY signal indicating the completion of the connection from the sending side of the connection to the terminating side via the external network.

26. A call and connection separated network in accordance with claim 25, wherein said second process is created by a further second process of an adjacent domain, and said further second process in its turn is created by said first process.

27. In a call and connection separated network, a method of routing a connection from a calling user to a called user, both residing in the call- and connection separated network, via an intermediate external network comprising the steps of:
  (a) assigning temporary routing numbers selected in the number plan of the external network to a switching node of the call- and connection network,
  (b) selecting one of said routing numbers and assigning it to said call,
  (c) using said selected routing number to route said call through the external network to said switching node, and
  (d) routing said call from said node to the called user.

28. In a call and connection separated network, a method of routing a connection in accordance with claim 27, further comprising after performing steps (a) and (b)
  routing the call from the calling user to an exit point of the call- and connection separated network that has an entry to the external network.
  next performing step (c), and
  next performing step (d).

29. A method to set up a call in a call and connection separated network, wherein the call and connection separated network comprises a homogeneous network and a satellite domain, and homogeneous network comprising a number of domains each one comprising at least one switch, said satellite domain comprising at least one switch and lacking a direct connection with the homogeneous network, the method comprising assigning routing numbers which belong to the external network and are used for routing of calls therein, to said homogeneous network, and the satellite domain using one of said routing numbers to set up a call from said satellite domain to said homogeneous network via the external network.

30. A method to set up a call in a call and connection separated network in accordance with claim 29, wherein said homogeneous network comprises a switch, referred to as the first switch, and said satellite domain comprises a switch, referred to as the second switch, wherein one of said routing numbers is used to set up a connection from the first switch to the second switch via the external network.

31. A method to set up a call through a domain of a homogeneous network, said domain comprising a first and a second switch, said domain being included in a call and connection separated network that comprises a connection layer for set up and release of connections using a first signalling protocol and a call layer, referred to as a service layer, for supplying the service requested in a call, and an external network using a second protocol, different from said first protocol, for set up and release of connections, whereby said call through said domain is set up via the external network, the method comprising assigning routing numbers which belong to the external network and are used for routing of calls therein, to said domain, and said domain using one of said routing numbers to set up a call from the first switch to the second switch in said domain via the external network.

* * * * *